United States Patent
Hosseini et al.

(10) Patent No.: US 12,199,720 B2
(45) Date of Patent: Jan. 14, 2025

(54) CHANNEL STATE INFORMATION FOR MULTIPLE COMMUNICATION LINKS

(71) Applicant: QUALCOMM Incorporated, San Diego, CA (US)

(72) Inventors: Seyedkianoush Hosseini, San Diego, CA (US); Wei Yang, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 336 days.

(21) Appl. No.: 17/686,289

(22) Filed: Mar. 3, 2022

(65) Prior Publication Data

US 2022/0286179 A1    Sep. 8, 2022

Related U.S. Application Data

(60) Provisional application No. 63/159,886, filed on Mar. 11, 2021, provisional application No. 63/157,612, filed on Mar. 5, 2021.

(51) Int. Cl.
*H04W 4/06* (2009.01)
*H04B 7/06* (2006.01)
(Continued)

(52) U.S. Cl.
CPC ......... *H04B 7/0626* (2013.01); *H04B 7/0658* (2013.01); *H04W 72/20* (2023.01); *H04W 72/51* (2023.01)

(58) Field of Classification Search
CPC .. H04B 7/0626; H04B 7/0628; H04B 7/0658; H04L 1/0026; H04W 72/20; H04W 72/51; H04W 72/542
See application file for complete search history.

(56) References Cited

U.S. PATENT DOCUMENTS

2012/0113816 A1* 5/2012 Bhattad ............... H04L 25/0226 370/246
2019/0222282 A1* 7/2019 Tsai .................... H04W 72/566
(Continued)

FOREIGN PATENT DOCUMENTS

EP    3840460 A1 *  6/2021 ........... H04L 1/0026
EP    4057681 A1 *  9/2022 ........... H04B 7/0626

OTHER PUBLICATIONS

International Search Report and Written Opinion—PCT/US2022/018883—ISA/EPO—Jun. 14, 2022 (2103023WO).
(Continued)

*Primary Examiner* — Phuc H Tran
(74) *Attorney, Agent, or Firm* — Holland & Hart LLP

(57) ABSTRACT

Methods, systems, and devices for wireless communications are described. Generally, a user equipment (UE) may perform channel state information (CSI) estimation on multiple links (e.g., a Uu link and a sidelink) without excessive power expenditures. The UE may report a CSI processing unit (CPU) capability to a network device. The CPU capability information may include separate CPU capabilities for separate links, or a single CPU capability for multiple links. The network device, the UE, or both, may trigger CSI estimation procedures that do not exceed the reported CPU capability, or may otherwise prioritize CSI estimation procedures based on the CPU capability. The UE may then perform CSI estimation procedures according to one or more rules associated with the CPU capabilities. In some examples, such rules may be explicitly signaled to the UE, or may be included in one or more standard documents.

24 Claims, 18 Drawing Sheets

(51) Int. Cl.
   *H04W 72/20*  (2023.01)
   *H04W 72/51*  (2023.01)

(56) References Cited

U.S. PATENT DOCUMENTS

| | | | |
|---|---|---|---|
| 2019/0229781 A1* | 7/2019 | Jin | H04B 7/0628 |
| 2020/0022089 A1* | 1/2020 | Guo | H04L 1/1812 |
| 2020/0350968 A1* | 11/2020 | Tsai | H04B 7/0626 |
| 2020/0373985 A1 | 11/2020 | Tsai | |
| 2021/0028842 A1* | 1/2021 | Kim | H04B 7/0628 |
| 2023/0007659 A1* | 1/2023 | Wang | H04W 72/542 |

OTHER PUBLICATIONS

Moderator (AT&T): "Summary of UE Features for 5G V2X", 3GPP Draft, R1-2004284, 3GPP TSG RAN WG1 #101, 3rd Generation Partnership Project (3GPP), Mobile Competence Centre, 650, Route Des Lucioles, F-06921 Sophia-Antipolis Cedex, France, vol. RAN WG1. No. e-Meeting, May 25, 2020-Jun. 5, 2020, May 26, 2020 (May 26, 2020), XP051891694, 28 Pages, Retrieved from the Internet: URL:https://ftp.3gpp.org/tsg_ran/WG1_RL1/TSGR1_101-e/Docs/R1-2004284.zip R1-2004284.doc [retrieved on May 26, 2020] the Whole Document.

* cited by examiner

CHANNEL STATE INFORMATION FOR MULTIPLE COMMUNICATION LINKS

CROSS REFERENCE

The present application for patent claims the benefit of U.S. Provisional Patent Application No. 63/157,612 by HOSSEINI et al., entitled "CHANNEL STATE INFORMATION FOR MULTIPLE COMMUNICATION LINKS," filed Mar. 5, 2021, and the benefit of U.S. Provisional Patent Application No. 63/159,886 by HOSSEINI et al., entitled "CHANNEL STATE INFORMATION FOR MULTIPLE COMMUNICATION LINKS," filed Mar. 11, 2021, each of which is assigned to the assignee hereof, and each of which is expressly incorporated by reference herein.

TECHNICAL FIELD

The following relates to wireless communications, including channel state information for multiple communication links.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support channel state information for multiple communication links. Generally, a user equipment (UE) may perform channel state information (CSI) estimation on multiple links (e.g., a it link and a sidelink) without excessive power expenditures. The UE may report a CSI processing unit (CPU) capability to a network device. The CPU capability information may include separate CPU capabilities for separate links, or a single CPU capability for multiple links. The network device, the UE, or both, may trigger CSI estimation procedures that do not exceed the reported CPU capability, or may otherwise prioritize CSI estimation procedures based on the CPU capability. The UE may then perform CSI estimation procedures according to one or more rules associated with the CPU capabilities. In some examples, such rules may be explicitly signaled to the UE, or may be included in one or more standard documents.

A method for wireless communications at a first user equipment (TUE) is described. The method may include communicating with a network device via a first link between the first UE and the network device, communicating with a second UE via a second link between the first UE and the second UE, and transmitting, to the network device via the first link, an indication of a channel state information (CSI) processing capability for CSI associated with the first link and CSI associated with the second link.

An apparatus for wireless communications at a first UE is described. The apparatus may include at least one processor, memory coupled (e.g., operatively, communicatively, functionally, electronically, or electrically) (with the at least on processor, and instructions stored in the memory. The instructions may be executable by the at least one processor to cause the apparatus to communicate with a network device via a first link between the first UE and the network device, communicate with a second UE via a second link between the first UE and the second UE, and transmit, to the network device via the first link, an indication of a CSI processing capability for CSI associated with the first link and CSI associated with the second link.

Another apparatus for wireless communications at a first UE is described. The apparatus may include means for communicating with a network device via a first link between the first UE and the network device, means for communicating with a second UE via a second link between the first UE and the second UE, and means for transmitting, to the network device via the first link, an indication of a CSI processing capability for CSI associated with the first link and CSI associated with the second link.

A non-transitory computer-readable medium storing code for wireless communications at a first UE is described. The code may include instructions executable by at least one processor to communicate with a network device via a first link between the first UE and the network device, communicate with a second UE via a second link between the first UE and the second UE, and transmit, to the network device via the first link, an indication of a CSI processing capability for CSI associated with the first link and CSI associated with the second link.

In some examples of the method, apparatuses, and non-transitory computer-readable medium described herein, transmitting the indication of the CSI processing capability may include operations, features, means, or instructions for transmitting a first CSI processing capability associated with the first link and a second CSI processing capability associated with the second link, the first CSI processing capability indicating a first subset of processing units of a total number of processing units, and the second CSI processing capability indicating a second subset of processing units of the total number of processing units.

Some examples of the method, apparatuses, and non-transitory computer-readable medium described herein may further include operations, features, means, or instructions for receiving, from the network device, an indication of one or more rules for performing CSI estimation procedures according to the CSI processing capability.

Some examples of the method, apparatuses, and non-transitory computer-readable medium described herein may further include operations, features, means, or instructions for performing, according to the CSI processing capability, CSI estimation procedures associated with the first link and CPSI estimation procedures associated with the second link, generating a first CSI report for the first link and a second CSI report associated with the second link, and transmitting the first CSI report and the second CSI report to the network device via the first link.

Some examples of the method, apparatuses, and non-transitory computer-readable medium described herein may further include operations, features, means, or instructions for triggering a first CSI estimation procedure associated with the first link and a second CSI estimation procedure associated with the first link, triggering a third CSI estimation procedure associated with the second link and a fourth CSI estimation procedure associated with the second link, placing the first CSI estimation procedure and the second CSI estimation procedure in a first queue for the first link, and placing the third CSI estimation procedure and the fourth CSI estimation procedure in a second queue for the second link.

Some examples of the method, apparatuses, and non-transitory computer-readable medium described herein may further include operations, features, means, or instructions for performing the first CSI estimation procedure using a first available processing unit of the first subset of processing units based on triggering the first CSI estimation procedure before triggering the second CSI estimation procedure and performing the third CSI estimation procedure using a first available processing unit of the second subset of processing units based on triggering the third CSI estimation procedure before triggering the second CSI estimation procedure.

In some examples of the method, apparatuses, and non-transitory computer-readable medium described herein, transmitting the indication of the CSI processing capability may include operations, features, means, or instructions for transmitting a CSI processing capability associated with both the first link and the second link, the CSI processing capability indicating a total number of processing units for performing CSI estimation procedures on the first link and the second link.

Some examples of the method, apparatuses, and non-transitory computer-readable medium described herein may further include operations, features, means, or instructions for receiving, from the network device, an indication of one or more rules for performing CSI estimation procedures according to the CSI processing capability.

Some examples of the method, apparatuses, and non-transitory computer-readable medium described herein may further include operations, features, means, or instructions for performing, according to the CSI processing capability, CSI estimation procedures associated with the first link and CSI estimation procedures associated with the second link, generating a first CSI report for the first link and a second CSI report associated with the second link, and transmitting the first CSI report and the second CSI report to the network device via the first link.

Some examples of the method, apparatuses, and non-transitory computer-readable medium described herein may further include operations, features, means, or instructions for performing, according to the CSI processing capability, CSI estimation procedures for the first link and CSI estimation procedures associated with the second link and allocating resources for the second UE on the second link based on the CSI estimation.

Some examples of the method, apparatuses, and non-transitory computer-readable medium described herein may further include operations, features, means, or instructions for initiating a first CSI estimation procedure associated with the first link and a second CSI estimation procedure associated with the second link, selecting the first CSI estimation procedure or the second CSI estimation procedure based on which of the first CSI estimation procedure and the second CSI estimation procedure may be triggered first in time, and performing the selected CSI estimation procedure using a first available processing unit of the total number of processing units.

Some examples of the method, apparatuses, and non-transitory computer-readable medium described herein may further include operations, features, means, or instructions for triggering a first CSI estimation procedure associated with the first link and a second CSI estimation procedure associated with the second link, comparing a first priority level associated with the first CSI estimation procedure with a second priority level associated with the second CSI estimation procedure, selecting, based on the comparing, the first CSI estimation procedure or the second CSI estimation procedure, and performing the selected CSI estimation procedure using a first available processing unit of the total number of processing units.

Some examples of the method, apparatuses, and non-transitory computer-readable medium described herein may further include operations, features, means, or instructions for determining, based on the comparing, that the first priority level and the second priority level may be the same and determining, based on the first priority level and the second priority level being the same, which of the first CSI estimation procedure and the second CSI estimation procedure may be triggered first in time, where using the first available processing unit of the total number of processing units to perform the first CSI estimation procedure or the second CSI estimation procedure may be based on determining which of the first CSI estimation procedure and the second estimation procedure may be triggered first in time.

Some examples of the method, apparatuses, and non-transitory computer-readable medium described herein may further include operations, features, means, or instructions for triggering a third CSI estimation procedure associated with the first link or the second link, where the third CSI estimation procedure may be associated with a third priority level, initiating the third CSI estimation procedure using a second available processing unit of the total number of processing units, triggering a fourth CSI estimation procedure associated with the first link or the second link, where the fourth CSI estimation procedure may be associated with a fourth priority level that may be higher than the third priority level, releasing the second available processing unit from the third CSI estimation procedure, and initiating the fourth CSI estimation procedure using the released second available processing unit.

A method for wireless communications at a network device is described. The method may include communicating with a first UE via a first link between the network device and the first UE, receiving, from the first UE via the first link, an indication of a CSI processing capability of the first UE, for CSI associated with the first link and CSI associated with a second link between the first UE and a second UE, and triggering one or more CSI estimation procedures for the first UE, the second UE, or both, based on receiving the indication of the CSI processing capability.

An apparatus for wireless communications at a network device is described. The apparatus may include at least one processor, memory coupled (e.g., operatively, communicatively, functionally, electronically, or electrically) with the at least one processor, and instructions stored in the memory. The instructions may be executable by the at least one processor to cause the apparatus to communicate with a first UE via a first link between the network device and the first UE, receive, from the first UE via the first link, an indication of a CSI processing capability of the first UE, for CSI associated with the first link and CSI associated with a second link between the first UE and a second UE, and trigger one or more CSI estimation procedures for the first UE, the second UE, or both, based on receiving the indication of the CSI processing capability.

Another apparatus for wireless communications at a network device is described. The apparatus may include means for communicating with a first UE via a first link between the network device and the first UE, means for receiving, from the first UE via the first link, an indication of a CSI processing capability of the first UE, for CSI associated with the first link and CSI associated with a second link between the first UE and a second UE, and means for triggering one or more CSI estimation procedures for the first UE, the second UE, or both, based on receiving the indication of the CSI processing capability.

A non-transitory computer-readable medium storing code for wireless communications at a network device is described. The code may include instructions executable by at least one processor to communicate with a first UE via a first link between the network device and the first UE, receive, from the first UE via the first link, an indication of a CSI processing capability of the first UE, for CSI associated with the first link and CSI associated with a second link between the first UE and a second UE, and trigger one or more CSI estimation procedures for the first UE, the second UE, or both, based on receiving the indication of the CSI processing capability.

In some examples of the method, apparatuses, and non-transitory computer-readable medium described herein, receiving the indication of the CSI processing capability may include operations, features, means, or instructions for receiving a first CSI processing capability associated with the first link and a second CSI processing capability associated with the second link, the first CSI processing capability indicating a first subset of processing units of a total number of processing units at the UE, and the second CSI processing capability indicating a second subset of processing units of the total number of processing units at the UE.

Some examples of the method, apparatuses, and ion-transitory computer-readable medium described herein may further include operations, features, means, or instructions for transmitting, to the UE, an indication of one or more rules for performing CSI estimation procedures according to the CSI processing capability.

Some examples of the method, apparatuses, and non-transitory computer-readable medium described herein may further include operations, features, means, or instructions for receiving, from the UE, a first CSI report associated with the first link and a second CSI report for the second link.

Some examples of the method, apparatuses, and non-transitory computer-readable medium described herein may further include operations, features, means, or instructions for transmitting, to the first UE, a first trigger for one or more CSI estimation procedures associated with the first link and transmitting, to the first UE, the second UE, or both, a trigger for one or more CSI estimation procedures associated with the second link.

In some examples of the method, apparatuses, and non-transitory computer-readable medium described herein, receiving the indication of the CSI processing capability may include operations, features, means, or instructions for receiving a CSI processing capability associated with both the first link and the second link, the CSI processing capability indicating a total number of processing units for performing, by the first UE, CSI estimation procedures on the first link and the second link.

Some examples of the method, apparatuses, and non-transitory computer-readable medium described herein may further include operations, features, means, or instructions for transmitting, to the first UE, an indication of one or more rules for performing CSI estimation procedures according to the CSI processing capability.

Some examples of the method, apparatuses, and non-transitory computer-readable medium described herein may further include operations, features, means, or instructions for receiving, from the UE based on the CSI processing capability, a first CSI report for the first link and a second CSI report for the second link.

DETAILED DESCRIPTION

Figure 1:
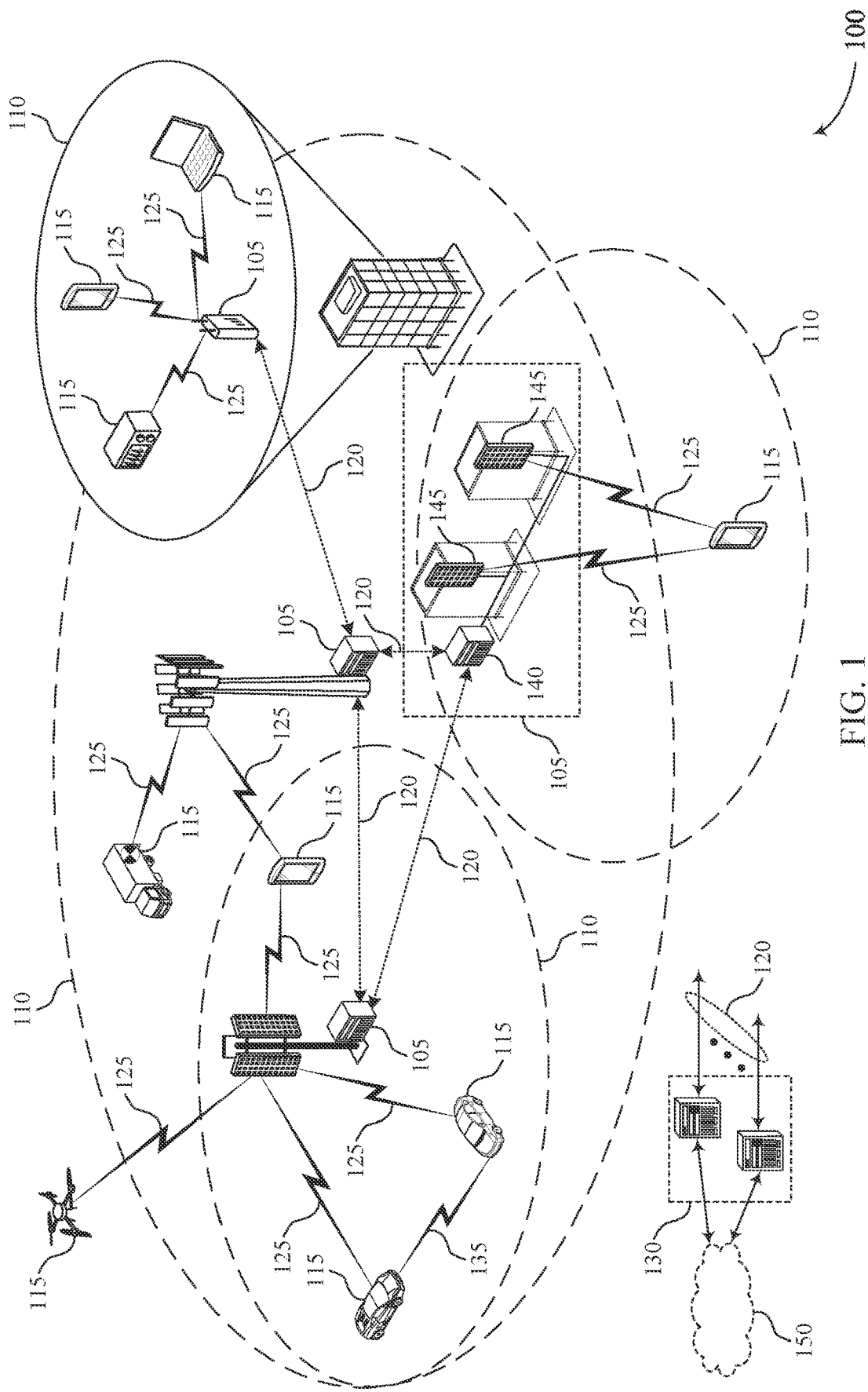
FIG. 1 illustrates an example of a wireless communications system that supports channel state information for multiple communication links in accordance with aspects of the present disclosure.

Wireless communications systems may include different types of communication devices, which may operate according to different procedures. The communication devices may also communicate within different communication channels. Some communication devices may include user equipments (UEs) and network devices. In some examples, UEs and network devices may communicate using a Uu or cellular communications link. In these cases, a UE may transmit uplink communications to a network device and may receive downlink communications from the network device on the Uu link.

In some cases, UEs and other devices may also communicate via a sidelink, UEs may communicate with other UEs over sidelink channels, by transmitting and receiving sidelink messages. UEs capable of sidelink communications may communicate with other UEs (e.g., C-UEs), vehicle UEs (V-UEs), road-side units (RSUs), smart devices, or wearable devices (e.g., smart watches, smart glasses, or earbuds). Sidelink UEs may communicate with each other over sidelink channels. Sidelink communications may be an example of one radio access technology (RAT), while Uu communications may be an example of a different RAT.

Some examples of a wireless communications system may support channel state information (CSI) estimation for multiple RATs. For example, A UE may be in communication with a network device via an access link (e.g., a Uu link), and another UE via a sidelink. The UE may perform CSI estimation on the access link, and may further perform CSI estimation on the sidelink. The UE may have a limited amount of computational resources available for performing CSI estimation (e.g., one or more CSI processing units (CPUs)). The UE may use one or more available CPUs for each triggered CSI estimation procedure. In conventional systems, a UE may apply CPUs to triggered CSI estimation procedures in a first-in-first-out (FIFO) manner.

In some communications systems, a UE may be triggered for a number of CSI estimations, and may drop any additional triggered CSI estimation procedures above the CPU capability of the UE. In some examples, a network device may trigger CSI estimations. However, the network device may not be aware of or may not trigger all CSI estimations performed by the UE or by another sidelink UE in communication with the UE. For instance, the sidelink UEs may trigger sidelink CSI estimation procedures without indicating such sidelink CSI estimation procedures to the network device or reporting CSI to the network device. Additionally, in some systems (e.g., 5G systems) resources may be allocated to the sidelink UE for CSI estimation and CSI reporting, a UE may be expected not to drop any CSI estimation procedures triggered by the network device (e.g., dropping triggered CSI estimation procedures may result in inefficient use of resources, stale data reporting, or delays). Thus, if a UE does not effectively determine both access link CSI and sidelink CSI, the sidelink communication quality may suffer. However, excessive computation of CSI on multiple links may lead to a significant increase in UE complexity, power expenditures, or inefficient use of computational resources.

In some examples, to perform CSI estimation on multiple links (e.g., a Uu link and a sidelink) without excessive power expenditures, a UE may report its CPU capability to the network device. A network device, the UE, or both, may trigger CSI estimation procedures that do not exceed the reported CPU capability, or otherwise prioritize CSI estimations based on the CPU capability. The UE may then perform CSI estimation procedures according to one or more rules associated with the CPU capabilities. In some examples, such rules may be explicitly signaled to the UE, or may be included in one or more standard documents.

The UE may report a separate capability to the network device for each of the Uu link and the sidelink (e.g., a number of CPUs for the sidelink and a number of CPUs for the access link). The network device may trigger an appropriate number of CSI estimation procedures for the Uu link (e.g., without exceeding the UE's capacity on the Uu link). The network device may also trigger (e.g., via the UE), or the UE may trigger, an appropriate number of CSI estimation procedures for the sidelink. In such examples, the UE may manage CSI estimation procedures for the sidelink on a FIFO basis, and may separately manage CSI estimation procedures for the Uu link on a FIFO basis.

In some examples, the UE may report a single capability to the network device for both the Uu link and the sidelink (e.g., a total number of CPUs for CSI estimation procedures on either the sidelink or the Uu link). In such examples, the UE may flexibly apply available CPUs to sidelink or Uu link CSI estimation procedures. For instance, the UE may apply CPUs to CSI estimation procedures on a FIFO basis, regardless of whether the CSI estimation is for the Uu link or the sidelink. In such cases, the network device may trigger both sidelink and access link CSI estimation procedures, and may do so without exceeding the total CPU capability indicated by the UE. In some examples, the UE may apply CPUs to CSI estimation procedures based on a priority level of the triggered CSI estimation procedure. For instance, periodic CSI estimation procedures for the Uu link may have a lower priority than aperiodic CSI or semi-persistent CSI estimation procedures. In some examples, CSI estimation procedures one of the links may take priority over CSI estimation procedures on the other link. In such examples, the UE may apply CPUs to higher priority CSI estimation procedures before applying CPUs to lower priority CSI estimation procedures. If a new CSI estimation procedure is triggered that has a higher priority than another CSI estimation procedure that is already underway (and if all reported CPUs are already being used), the UE may release one or more PDUs being used on the lower priority CSI estimation procedure, and apply them instead to the new, higher priority CSI estimation procedure.

Aspects of the disclosure are initially described in the context of wireless communications systems. Aspects of the disclosure are further illustrated by and described with reference to wireless communications systems, control messages, CSI configurations, and process flows. Aspects of the disclosure are further illustrated by and described with reference to apparatus diagrams, system diagrams, and flowcharts that relate to channel state information for multiple communication links.

FIG. 1 illustrates an example of a wireless communications system 100 that supports channel state information for multiple communication links in accordance with aspects of the present disclosure. The wireless communications system 100 may include one or more base stations 105, which may be examples of one or more network devices, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

As described herein, a base station 105 may include one or more components that are located at a single physical location or one or more components located at various physical locations, and any one or more of such components may be referred to herein as a network device. In examples in which the base station 105 includes components that are located at various physical locations, the various components may each perform various functions such that, collectively, the various components achieve functionality that is similar to a base station 105 that is located at a single physical location. As such, a base station 105 or network device described herein may equivalently refer to a standalone base station (also known as a monolithic base station) or a base station 105 including network device components that are located at various physical locations or virtualized locations (also known as a disaggregated base station 105). In some implementations, such a base station 105 including network device components that are located at various physical locations may be referred to as or may be associated with a disaggregated radio access network (RAN) architecture, such as an Open RAN (O-RAN) or Virtualized RAN (VRAN) architecture. In some implementations, such network device components of a base station 105 may include or refer to one or more of a central unit (or centralized unit CU), a distributed unit (DU), or a radio unit (RU).

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home Node B, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, or a personal computer a netbook, a smartbook, a personal computer, a smart device, a wearable device (e.g., a smart watch, smart clothing, smart glasses, virtual reality goggles, a smart wristband, smart jewelry (e.g. a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot maw have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of Symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g. control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others).

In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), and mMTC (massive MTC), and NB-IoT may include eNB-IoT (enhanced NB-IoT), and FeNB-IoT (further enhanced NB-IoT).

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g. UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105). In some examples, a network entity may refer to a base station 105, or one or more components or subcomponent of the base station 105, such as an access network entity 140, a transmission entity 145, or any other component or subcomponent of a base station 105.

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g. from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, to perform CSI estimation on multiple links (e.g., a Uu link and a sidelink) without excessive power expenditures, a UE 115 may report its CPU capability to the base station. A base station 105, the UE115, or both, may trigger CSI estimation procedures that do not exceed the reported CPU capability, or otherwise prioritize CSI estimations based on the CPU capability. The UE 115 may then perform CSI estimation procedures according to one or more rules associated with the CPU capabilities. In some examples, such rules may be explicitly signaled to the UE, or may be included in one or more standard documents.

The UE 115 may report a separate capability to the base station for each of the Uu link and the sidelink (e.g., a number of CPUs for the sidelink and a number of CPUs for the access link). The base station may trigger an appropriate number of CSI estimation procedures for the Uu link (e.g., without exceeding the UE's capacity on the Uu link). The base station may also trigger (e.g., via the UE 115), or the UE 115 may trigger, an appropriate number of CSI estimation procedures for the sidelink. In such examples, the UE may manage CSI estimation procedures for the sidelink on a FIFO basis, and may separately manage CSI estimation procedures for the Uu link on a FIFO basis.

In some examples, the UE may report a single capability to the base station for both the Uu link and the sidelink (e.g., a total number of CPUs for CSI estimation procedures on either the sidelink or the Uu link). In such examples, the UE 115 may flexibly apply available CPUs to sidelink or Uu link CSI estimation procedures. For instance, the UE 115 may apply CPUs to CSI estimation procedures on a FIFO basis, regardless of whether the CSI estimation is for the Uu link or the sidelink. In such cases, the base station may trigger both sidelink and access link CSI estimation procedures, and may do so without exceeding the total CPU capability indicated by the UE115. In some examples, the UE 115 may apply CPUs to CSI estimation procedures based on a priority level of the triggered CSI estimation procedure. For instance, periodic CSI estimation procedures for the Uu link may have a lower priority than aperiodic CSI or semi-persistent CSI estimation procedures. In some examples, CSI estimation procedures one of the links may take priority over CSI estimation procedures on the other link. In such examples, the UE 115 may apply CPUs to higher priority CSI estimation procedures before applying CPUs to lower priority CSI estimation procedures. If a new CSI estimation procedure is triggered that has a higher priority than another CSI estimation procedure that is already underway (and if all reported CPUs are already being used), the UE may release one or more PDUs being used on the lower priority CSI estimation procedure, and apply them instead to the new, higher priority CSI estimation procedure.

Figure 2:
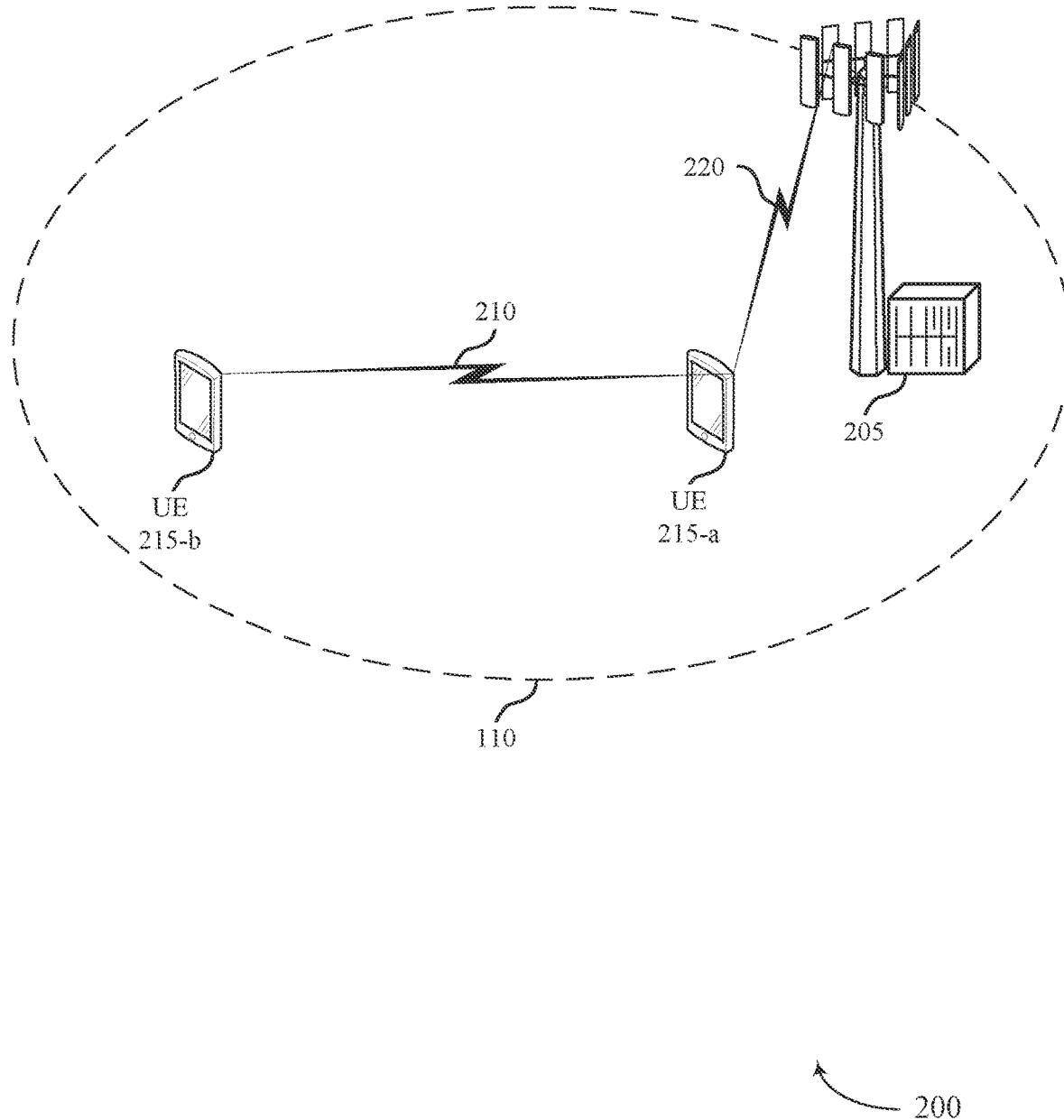
FIG. 2 illustrates an example of a wireless communications system that supports channel state information for multiple communication links in accordance with aspects of the present disclosure.

FIG. 2 illustrates an example of a wireless communications system 200 that supports channel state information for multiple communication links in accordance with aspects of the present disclosure. Wireless communications system 200 may include a base station 205 (which may be an example of a network device), a UE 215-a, and a UE 215-b, which may be examples of corresponding devices (e.g., base stations 105 and UEs 115) described with reference to FIG. 1.

UE 215-a may communicate with base station 205 via a Uu link 220. UE 215-a may also communicate with UE 215-b via sidelink 210. The UE 215-a may perform CSI estimation for the Uu link. UE 215-a may also support CSI reporting for the sidelink 210. UE 215-a may transmit sidelink CSI reference signals (RS) (e.g., which may be referred to as SL CSI-RS, or a SL-RS) within a unicast physical sidelink shared channel transmission (PSSCH) if one or more conditions are satisfied. For example, UE 215-a may transmit the sidelink CSI-RS within the PSSCH transmission if CSI reporting is enabled by higher layer signaling (e.g., via a si-CSI-Acquisition parameter), if a CSI request field in a corresponding sidelink control information (SCI) format (e.g., SCI format 0-2) is set to a particular value (e.g., 1), or both. For CSI-RS transmissions, one or more parameters may be configured by higher layer signaling. For example, a first parameter (e.g., nrofPortsCSIRS-SL) may indicate a number of ports for the SL CSI-RS, a second parameter (e.g., firstSymbolInTimeDomainCSIRS-SL) may indicate a first OFDM symbol in a physical resource block (PRB) used for sidelink CSI-RS, and a third parameter (e.g., frequDomainAllocationCSIRS-SL) may indicate the frequency domain allocation for SL CSI-RS. UE 215-a may transmit CSI reports to base station 205, and each CSI report may include a channel quality indicator (CQI), a rank indicator (RI), or any combination thereof. The CQI and the RI may be reported together.

UE 215-a may calculate CSI parameters (e.g., if reported), assuming one or more dependencies between CSI parameters (e.g., the CQI may be calculated conditioned on reported RI). In some examples, CSI reporting may be aperiodic. In some examples, a CSI-RS configuration (e.g., an aperiodic CSI-RS) may be triggered by SCI. In some examples, wireless communications system 200 may support wideband CQI reporting for CSI reporting. Wideband CQI may be reported (e.g., for each codeword), for an entire CSI reporting band, which may be limited to the PSSCH transmission band.

Sidelink CSI reports may be carried in a media access control (MAC) control element (CE), as described in greater detail with reference to FIG. 3.

In some examples, a CSI-triggering UE (e.g., UE 215-a) may not support triggering of another aperiodic CSI report for a same UE (e.g., UE 215-b) before a last slot of the expected reception or completion of an ongoing CSI report associated with the SCI format 2-A with the CSI request field set to 1. For example, if UE 215-a triggers a CSI estimation for UE 215-b, UE 215-a may not trigger a second CSI estimation for UE 215-b until a last slot of an expected CSI report until a CSI estimation and reporting procedure is complete, or until a final slot of an expected CSI report plus a fixed delay. The UE may request other CSI estimations and CSI reports from other UEs while one UE is performing a CSI estimation procedure.

In some examples, UE 215-a may receive a trigger to perform a CSI estimation procedure. UE 215-a may measure CSI, but may not be configured with a specific time to report the CSI. UE 215-a may identify existing resources for reporting CSI (e.g., may include the CSI report in a MAC CE, which may be included in a data message on the PSSCH). If UE 215-a cannot identify or does not have any available resources in which to transmit the CSI report (e.g., within a threshold amount of time), UE. 215-a may drop the CSI report and refrain from transmitting a CSI report. Thus, UE 215-a may cancel a triggered SL-CSI reporting if, for each pair of source layer 2 ID and destination layer 2 identifiers corresponding to a PC5-RRC connection which has been established by upper layers, the SL-CSI reporting has been triggered by an SCI and not canceled, and if the latency requirement of the SL-CSI reporting in sl-Latency-Bound-CSI-Report cannot be met (e.g., too much time has passed without UE 215-a identifying resources in which to transmit the CSI report). Or, if a MAC entity has SL resources allocated for new transmission and the sidelink shared channel resources can accommodate the SL CSI reporting MAC CE and its subheader as a result of logical channel prioritization, UE 215-a may instruct the multiplexing and assembly procedure to generate a sidelink CSI reporting MAC CE, or cancel the triggered SL CSI reporting. Or, if the MAC entity has been configured with Sidelink resource allocation in a first mode (e.g., mode 1), then UE 215-a may trigger a scheduling request (e.g., for the CSI report). A MAC entity of UE 215-a may be configured with sidelink resource allocation node 1, and may trigger a scheduling request if transmission of a pending SL-CSI reporting with the sidelink grant cannot fulfil the latency requirement associated with the SL-CSI reporting.

In some examples, a sidelink UE (e.g., UE 215-a) may not report sidelink SCI back to base station 205. A UE (e.g., UE 215-a) may skip transmission of a sidelink CSI report if it has not assigned a resource for the CSI report (e.g., under a first mode, which may be referred to as mode 1, or if the UE cannot identify a resource on which to transmit the CSI resource (e.g., under a second mode, which may be referred to as mode 2). In some examples, as described in greater detail with reference to FIG. 4, UE 215-a may support enhanced CSI acquisition using wide-band reference signals.

In some examples, UE 215-a may operate as a relay (e.g., between base station 205 and UE 215-b). UE 215-a may thus support sidelink CSI and Uu CSI. In some examples, UE 215-a may need to report both sidelink CSI and Uu CSI to base station 205 to support high performance with high quality on both links. However, reporting CSI on both links may result in increased complexity at UE 215-a. Techniques for reporting CSI for both links may be necessary to improve the likelihood of low latency and high reliability on both the sidelink and the Uu link.

In some examples, to maintain a manageable CSI reporting load for a UE (e.g., UE 215-a), CSI processing may be defined in terms of CSI processing units (CPUs). Each CSI triggering (e.g., each CSI estimation procedure triggered for UE 215-a by base station 205 or another sidelink UE 215-b) depending on how involved the CSI computations are, may use a number of CPUs. For example, a UE 215-a may occupy one or more CPUs for a given CSI estimation. In some examples, the number of CPUs occupied for a CSI estimation (e.g., one CPU, or multiple CPUs) may depend on a complexity of the CSI estimation (e.g. sub-band CSI estimation and reporting may be more involved or utilize more computational resources than wideband CSI estimation and reporting, or CSI estimation and reporting complexity may depend on a number of ports utilized). UE 215-a may indicate a number of supported simultaneous CSI calculations (e.g., $N_{CPU}$) with a parameter value (e.g., simultaneousCSI-ReportsPerCC) in a component carrier, and another parameter (e.g. simultaneous CSI-ReportsAllCC) across all component carriers. IF UE 215-a supports $N_{CPU}$ simultaneous CSI calculations, then UE 215-a may be considered to have $N_{CPU}$ CPUs for processing CSI reports. If a number (e.g., L) of CPUs are occupied for calculation of CSI reports in a given OFDM symbol, UE 215-a may have $N_{CPU}$–L unoccupied (e.g., available) CPUs. If N CSI reports start occupying respective CPUs on the same OFDM symbol on which $N_{CPU}$–L CPUs are unoccupied, where each CSI report (e.g., n=0 . . . N–1) corresponds to $O_{CPU}^{(n)}$, UE 215-a may not update the N-M requested CSI reports with lowest priority (e.g., according to priority levels associated with each CSI report), where 0≤M≤N is the largest value such that $\Sigma_{n=0}^{M-1} O_{CPU}^{(n)} \leq N_{CPU}$–L holds.

UE 215-a may utilize (e.g., occupy) CPUs according to one or more rules or conditions. UE 215-a may be triggered to perform a CSI estimation procedure and generate a CSI report (e.g., via a parameter such as a CSI-ReportConfig parameter) with higher layer parameter reportQuantity not set to 'none' UE 215-a may occupy available CPUs for a number of OFDM symbols according to one or more rules. For example, a periodic or semi-persistent CSI report (e.g., excluding an initial semi-persistent CSI report on a physical uplink shared channel (PUSCH) after the physical downlink control channel (PDCCH) triggering the report) may occupy CPUs from a first symbol of an earlier one of each CSI-RS, or CSI-IM, or synchronization signal block (SSB) resource for a channel or interference measurement, respective latest CSI-RS/CSI-IM/SSB occasion no later than the corresponding CSI reference resources, until the last symbol of the configured uplink channel (PUSCH or PUCCH) carrying the report. In some examples, a periodic CSI report may occupy CPUs from the first symbol after the PDCCH triggering the CSI report until the last symbol of the schedule PUSCH carrying the report. In some examples, an initial semi-persistent CSI report on a PUSCH after a PDCCH trigger may occupy CPUs for the first symbol after the PDCCH until the last symbol of the scheduled PUSCH earring, the report.

In some examples, UE 215-a may occupy CPUs in a FIFO manner (e.g., the CSI reports that are triggered earlier in time occupy available CPUs). If a number of remaining CPUs is not sufficient to perform a CSI estimation, UE 215-a may not update the CSI reports that are triggered later in time. In such cases, UE 215-a may report stale CSI. Such techniques may be effective in cases where base station 205 has full control (e.g., has indications of) an order of CSI reporting triggers (e.g., base station 205 triggers all CSI reports for UE 215-a on the Uu link). However, in cases where UE 215-a is also communicating on the sidelink, sidelink CSI estimation may be triggered by UE 215-a or UE 215-b (e.g., without input or instruction from base station 205). Additionally, base station 205 may allocate reporting resources for CSI reporting to UE 215-a. Thus, if UE 215-a drops CSI calculations and reports, (e.g., as described herein with reference to conventional systems without sidelink CSI reporting), then allocated resources may not be efficiently utilized. Thus, if UE 215-a is overscheduled with CSI estimation (e.g., both for the Uu and the sidelink), then UE 215-a may experience increased complexity (e.g., to successfully perform all triggered CSI estimations), or may report stale data, resulting in increased latency, decreased channel quality, increase computational complexity, and the like. Or, if UE 215-a drops CSI estimations that exceed a CPU capability, wireless communications system 200 may experience decreased efficiency in use of allocated resources, increased system latency, or decreased user experience.

In some examples, as described in greater detail with reference to FIGS. 5-6, a UE 215-a may perform CSI estimation for multiple links. The UE 215-a may transmit CPU capability information to base station 205, and base station 205 may trigger CSI estimation procedures according to the reported capability information. The CPU capability information may indicate two separate capabilities (e.g., a CPU capability including a number of available CPUs for each link), or a single capability to be shared across multiple links (e.g., a single number of CPUs available for CSI estimation procedures on both links). UE 215-*a* may apply CPUs to triggered channel estimation procedures according to the reported CPU capability and may further apply the CPUs to channel estimation procedures according to one or more rules (e.g., timing rules, or priority rules). Such techniques are described in greater detail with reference to FIGS. 5-6. Sidelink CSI reporting control signals (e.g., which may be used to transmit a sidelink CSI report) are described with reference to FIG. 3. Wideband sidelink reference signals, for sidelink CSI estimation, are described with reference to FIG. 4.

Figure 3:
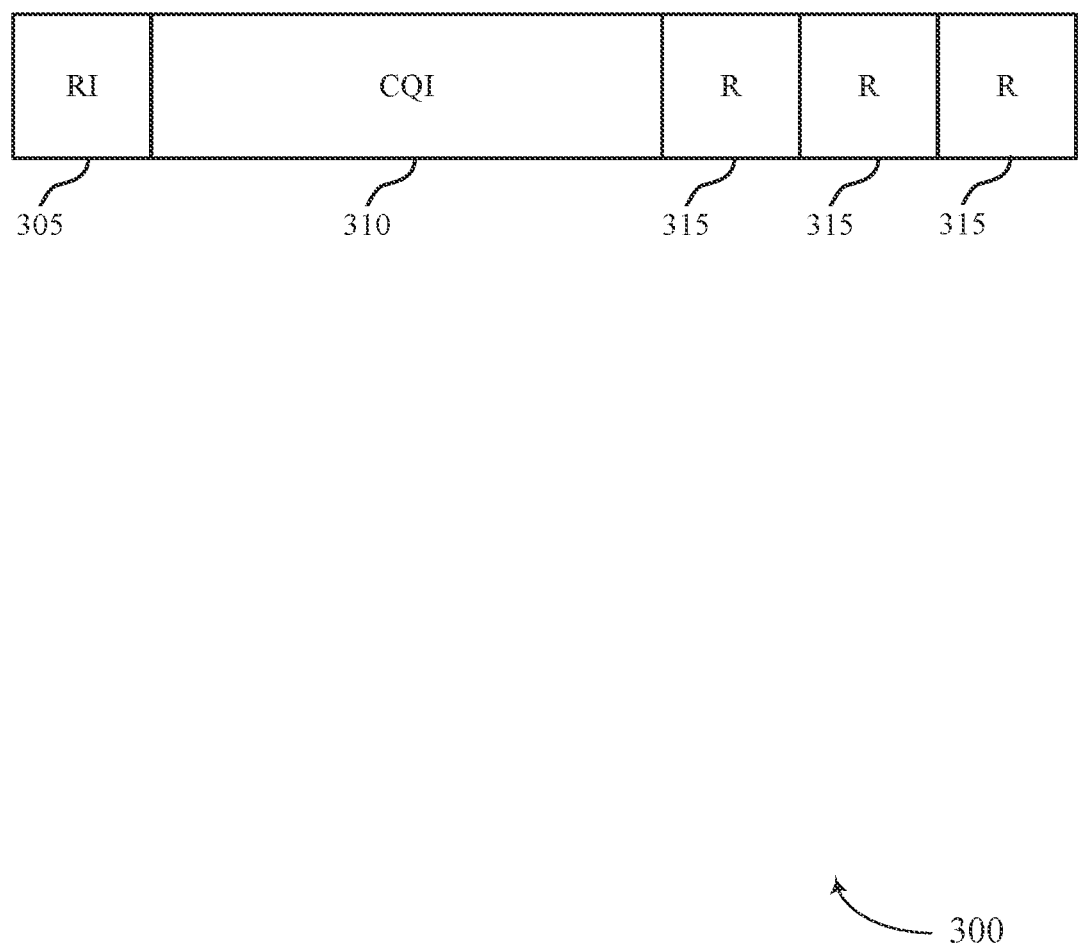
FIG. 3 illustrates an example of a control message that supports channel state information for multiple communication links in accordance with aspects of the present disclosure.

FIG. 3 illustrates an example of a control message 300 that supports channel state information for multiple communication links in accordance with aspects of the present disclosure. Control message 300 may be transmitted by a device, such as a UE 115, which may be an example of corresponding devices described with reference to FIGS. 1-2.

In some examples, a UE (e.g., such as UE 215-*a*) may transmit a CSI report in a CSI reporting control message 300 (e.g., a MAC-CE). The CSI reporting MAC CE may be identified by a MAC subheader with a logical channel ID (LCID) for sidelink CSI reporting. The priority of a sidelink CSI reporting MAC CE may be indicated by a fixed value (e.g. fixed to 1). The sidelink CSI reporting MAC CE may include a first field 305. Field 305 may be a RI field. Field 305 may indicate a derived value of the rank indicator for sidelink CSI reporting. Field 305 may have a length of one bit. Field 310 may be a CQI field. Field 310 may indicate a derived value of the CQI for sidelink CSI reporting. The length of field 310 may be 4 bits. The MAC CE may also include one or more fields 315 with reserved bits (e.g. set to zero). In some examples, the UE may perform a triggered CSI estimation, and may identify a data transmission in which to include control message 300, including the CSI report.

In some examples, a UE (e.g., UE 215-*a*) may transmit, to a base station (e.g., base station 205), or another UE, a CSI report using the control message 300, as described in greater detail with reference to FIGS. 5 and 6. Transmitting such sidelink reports may be based on CSI estimation that is based at least in part on CPU capability reporting, as described herein.

Figure 4:
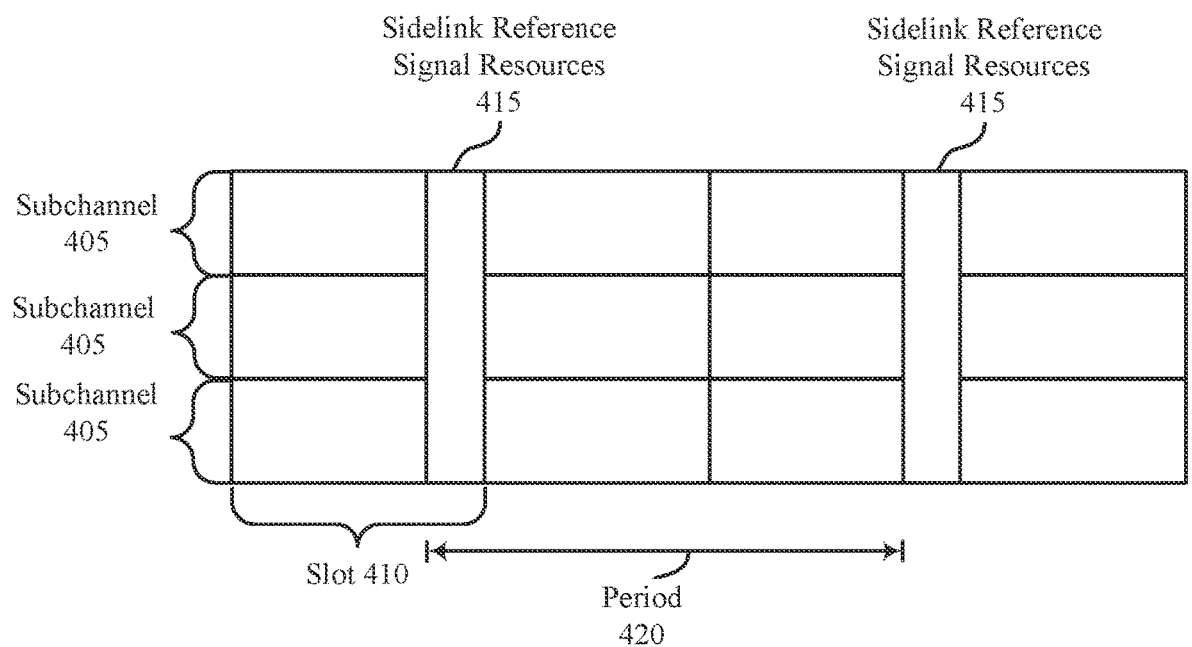
FIG. 4 illustrates an example of a CSI configuration that supports channel state information for multiple communication links in accordance with aspects of the present disclosure.

FIG. 4 illustrates an example of a CSI configuration 400 that supports channel state information for multiple communication links in accordance with aspects of the present disclosure. In some examples, CSI configuration 400 may implement aspects of, or may be implemented by one or more devices (e.g., UEs 115 and base stations 105) as described with reference to FIGS. 1-4.

In some examples, a wireless communications system (e.g., wireless communications system 200) may support enhanced CSI acquisition using wide-band reference signals to improve resource efficiency (e.g., in mode 1 and mode 2). In some examples, to ensure availability of sidelink reference signals for CSI estimation procedures and to improve efficiency, sets of sidelink reference signal resources 415 may be allocated for wideband sidelink reference signals. Resources 415 may be allocated on a per resource pool basis. In some examples, a set of symbols in one or more slots 410 may be allocated as sidelink reference signal resources 415. In some examples, full slots 410 may be allocated for sidelink reference signal resources 415 (not shown). Sidelink reference signal resources 415 may span a full wideband (e.g., may span multiple subchannels 405). Sidelink reference signal transmissions on sidelink reference signal resources 415 may be independent of data transmissions.

In some examples, sidelink reference signal may be periodic (e.g., may occur once every period 420). In some examples, sidelink reference signal transmissions may be aperiodic (e.g., may be triggered by a base station 205 or another UE 215). In some examples, a UE 215-*a* (e.g., a remote UE, a relay UE, or a primary UE) may transmit sidelink reference signals to another UE (e.g., UE 215-*b*). The other UE (e.g., UE 215-*b*) may receive one or more sidelink reference signals on sidelink reference signal resources 415, may perform a channel estimation procedure, and may transmit a sidelink report (e.g., to UE 215-*a*, or to a base station 205). Or base station 205, UE 215-*a*, or UE 215-*b* may trigger a CSI estimation procedure at UE 215-*a*, UE 215-*a* may request an aperiodic sidelink reference signal, or may monitor for aperiodic sidelink reference signal, may receive one or more sidelink reference signals, and may perform CSI estimation based thereon. UE 215-*a* in such examples may utilize the CSI for scheduling sidelink communications with UE 215-*b*, may report the CSI to base station 205, or both.

As described with reference to FIG. 2, UE 215-*a* may also perform CSI estimation for the Uu link (e.g., along with CSI estimation for the sidelink). In such examples, UE 215-*a* may provide a CPU capability report to base station 205, and CSI estimation procedures (e.g. using CSI RSs from base station 205 and sidelink reference signals on sidelink reference signal resources 415 between UEs 215) may be based on such reporting.

Figure 5:
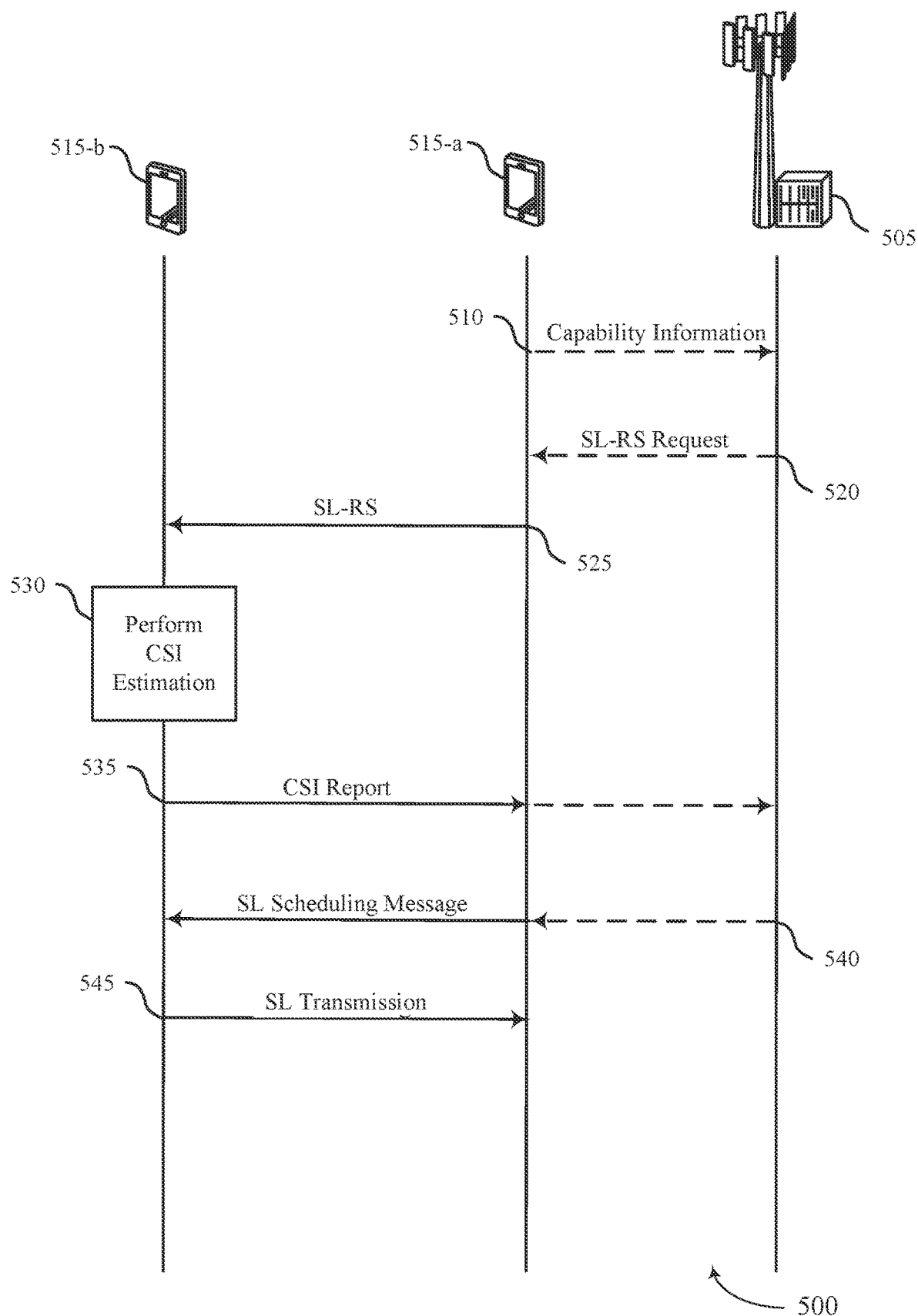
FIG. 5 illustrates an example of a process flow that supports channel state information for multiple communication links in accordance with aspects of the present disclosure.

FIG. 5 illustrates an example of a process flow 500 that supports channel state information for multiple communication links in accordance with aspects of the present disclosure. Process flow 500 may include a base station 505 (which may be an example of a network device), a UE 515-*a*, and a UE 515-*b*, which may be examples of corresponding devices (e.g., base stations 105 and UEs 115) described with reference to FIGS. 1-4.

In some examples, UE 515-*a* may be in communication with base station 505 via a first link (e.g., a Uu link), and may be in communication with UE 515-*b* via a second link (e.g. a sidelink). In some examples, UE 515-*a* may transmit aperiodic sidelink reference signals to a remote UE (e.g., UE 515-*b*), and UE 515-*b* may perform CSI estimation. For example, UE 515-*a* may autonomously determine to trigger an aperiodic CSI estimation procedure at UE 515-*b*, or base station 505 may transmit a sidelink reference signal request at 520. At 525, UE 515-*a* may transmit a sidelink reference signal (e.g., as described with reference to FIG. 4). At 530. UE 515-*b* may perform CSI estimation (e.g., by performing one or more measurements on the one or more sidelink reference signals received at 525). UE 515-*b* may generate a CSI report, and may transmit the CSI report to UE 515-*a*, base station 505, or both, at 535. In some examples, upon receiving the CSI report at 535, UE 515-*a* may forward the received CSI report to base station 505. At 540, UE 515-*a* may autonomously determine resources for sidelink communications with UE 515-*b*, or base station 505 may indicate sidelink resources on which UE 515-*b* is to communicate via the sidelink. At 540, UE 515-*a* may transmit a sidelink scheduling message to UE 515-*b* (e.g., indicating allocated resources or sidelink communications determined by UE 515-*a* or indicated by base station 505). At 545, UE 515-*b* may transmit a sidelink transmission to UE 515-*a* on the sidelink, using sidelink resources indicated in the sidelink scheduling message. Thus, because UE 515-*b* performs the CSI estimation procedure at 530, UE 515-*a* may not have to perform any CSI estimation.

In some examples, UE 515-*a* may transmit CPU capability information to base station 505. For example, at 510, UE 515-*a* may transmit CPU capability information indicating a total number of available CPUs for CSI estimation (e.g., on both links). However, UE 515-*a* may not be performing any CSI estimation on the sidelink (e.g., because UE 515-*b* is performing CSI estimation on the sidelink). Instead, UE 515-*a* may not be computing CSI, and may merely forward CSI reports received from UE 515-*b* at 535 to base station 505. In such examples, sidelink CSI may not occupy any of the available CPUs reported at 510. In some examples, UE 515-*a* may utilize available CPUs according to one or more rules. For instance, UE 515-*a* may occupy all available CPUs for CSI estimation on the Uu link if one or more conditions are satisfied (e.g., UE 515-*a* or base station 505 trigger CSI estimation at UE 515-*b*, such that UE 515-*a* does not compute CSI, CSI capability information indicates a total number of available CPUs for UE 515-*a*, or both). The one or more rules may be preconfigured at UE 515-*a*, indicated by base station 505, included in a standards document, or any combination thereof. In some examples, UE 515-*a* may be configured with various sets of rules for different scenarios. Base station 505 may indicate which set of rules to follow, or UE 515-*a* may select a set of rules from the various sets of rules based on identified conditions.

In some examples, UE 515-*a* may compute CSI for the sidelink and the Uu link, and may report CPUs and apply CPUs according to one or more rules, as described in greater detail with reference to FIG. 6.

Figure 6:
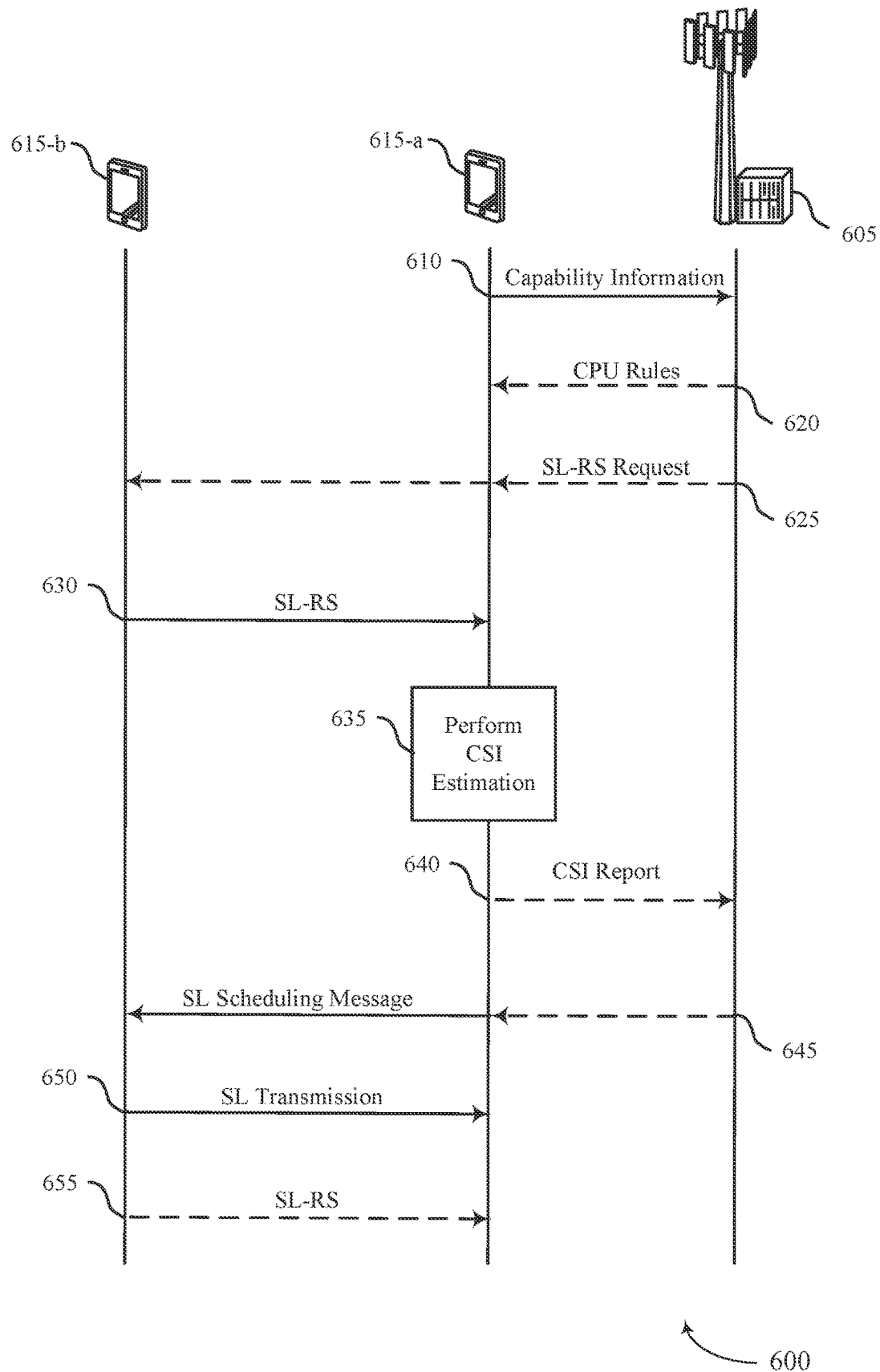
FIG. 6 illustrates an example of a process flow that supports channel state information for multiple communication links in accordance with aspects of the present disclosure.

FIG. 6 illustrates an example of a timeline 600 that supports channel state information for multiple communication links in accordance with aspects of the present disclosure. Timeline 600 may include a base station 505 (which may be an example of a network device), a UE 515-*a*, and a UE 515-*b*, which may be examples of corresponding devices (e.g., base stations 105 and UEs 115) described with reference to FIGS. 1-5. UE 615-*a* may be in communication with base station 605 via a first link (e.g., a Uu link), and in communication with UE 615-*b* via a second link (e.g., a sidelink).

In some examples, UE 615-*a* may perform CSI estimation based on periodic sidelink reference signal transmission. For example UE 615-*b* may periodically transmit sidelink reference signals (e.g., at 630 and at 655). UE 615-*a* may receive a sidelink reference signal at 630, and perform CSI estimation at 635. In some examples, UE 615-*a* may utilize the CSI estimated at 635 for sidelink scheduling. For example, at 645, UE 615-*a* may transmit a sidelink scheduling message to UE 615-*b* indicating sidelink resources for sidelink communication. At 650, UE 615-*b* may transmit, and UE 615-*a* may receive, a sidelink transmission (e.g., on the resources indicated in the sidelink scheduling message). In such examples (e.g., because the one or more sidelink reference signaling is periodic and does not need to be triggered by base station 605), base station 605 may not be aware of sidelink CSI estimation procedures.

In some examples, UE 615-*a* may perform CSI estimation based on aperiodic sidelink reference signal transmissions. For example, UE 615-*a*, or base station 605, may transmit a sidelink reference signal request at 625. In some examples, UE 615-*a* may autonomously transmit the sidelink reference signal request to UE 615-*b* (e.g., may autonomously trigger the aperiodic sidelink reference signal transmissions with or without base station 605 being aware of the triggered CSI estimation). In some examples, base station 605 may directly transmit the sidelink reference signal request to UE 615-*b*, or may transmit the sidelink reference signal request to UE 615-*a* and UE 615-*a* may forward the sidelink reference signal request to UE 615-*b* via the sidelink. At 630, UE 615-*b* may transmit the sidelink reference signal to UE 615-*a*. At 635, UE 615-*a* may perform CSI estimation based on the sidelink reference signal received at 630. At 640, UE 615-*a* may transmit a CSI report to base station 605. Base station 605 may transmit, to UE 615-*a* at 645, a sidelink scheduling message, which UE 615-*a* my forward to UE 615-*b* Or, in some cases. UE 615-*a* may not transmit the CSI report at 640, and may generate and transmit the sidelink scheduling message autonomously. At 650, UE 615-*b* may transmit a sidelink transmissions based on the received sidelink scheduling message.

In some examples, UE 615-*a* may transmit, to base station 605, capability information at 610. The capability information may include CPU capability for UE 615-*a* (e.g., a number of available CPUs). In some examples, the CPU capability may include an indication of separate CPU capability for sidelink CSI estimation and Uu CSI estimation. For example, the CSI estimation may include a number of CPUs for sidelink CSI estimation procedures and a separate number of CPUs for Uu CSI estimation procedures. For instance, in a case where each CPU can be occupied for one CSI estimation procedure and UE 615-*a* has a total CPU capability of 5 CPUs (e.g., in a given slot), UE 615-*a* may report 3 CPUs for Uu CSI estimation procedures and 2 CPUs for sidelink estimation procedures. Base station 605 may then trigger CSI estimations based on the indicated number of CPUs. For example (e.g., in cases of aperiodic sidelink reference signals triggered by base station 605), base station 605 may trigger no more than 3 CSI estimations on the Uu link, and may trigger no more than 2 CSI estimations on the sidelink (e.g., by transmitting sidelink reference signal request messages at 625) in a given transmission time interval (TTI) or set of TTIs. Or (e.g., in cases of periodic sidelink reference signals where UE 615-*a* does not report CSI to base station 605), base station 605 may schedule up to 3 CSI estimations on the Uu link, and may permit, UE 615-*a* to trigger CSI estimation procedures autonomously (e.g., up to 2 CSI estimation procedures on the sidelink in a given TTI or set of TTIs).

In some examples, UE 615-*a* may occupy CPUs in a FIFO manner on both links, independently of each other. For example, base station 605 may trigger 3 CSI estimation procedures on the Uu link. UE 615-*a* may occupy 3 CPUs in the order of triggering (e.g., a first CPU for a first triggered CSI estimation procedure, or a second CPU for a second triggered CSI estimation procedure). Or base station 605 may trigger 4 CSI estimation procedures on the Uu link (e.g., despite UE 615-*a* indicating only 3 available CPUs for the Uu link). In such examples, UE 615-*a* may occupy the 3 available CPUs for the first three triggered CSI estimations, and may ignore or drop the fourth triggered CSI estimation procedure. UE 615-*a* may similarly apply a FIFO rule to the sidelink.

In some examples, UP 615-*a* may occupy available CPUs according to the capability information indicated at 610, and further according to one or more rules. For example, UE 615-*a* may occupy CPUs on the separate links on a FIFO basis according to one or more rules. In some examples, base station 605 may indicate one or more CPU rules to UE 615-*a* at 620. In some examples, the one or more CPU rules may be included in one or more standards, or may be preconfigured at UE 615-*a*, or any combination thereof.

In some examples, UE 615-*a* may transmit, to base station 605, a capability information at 610. The capability information may include a CPU capability for UE 615-*a* (e.g. a number of available CPUs). In some examples, the CPU capability may include a single CPU capability (e.g., total number of CPUs) for both the Uu link and the sidelink. The single CPU capability may support sidelink CSI and Uu CSI. UE 615-*a* may occupy one or more CPUs for each triggered CSI estimation. A number of CPUs applied for a given CSI estimation may depend on a level of complexity (e.g., what needs to be done by UE 615-*a*). A number of CPUs occupied for a CSI estimation and reporting procedure may depend on whether the CSI estimation is sub-band or wideband CSI, or a number of ports to be used in the CSI estimation. Thus, in some examples, each CPU may be occupied for one CSI estimation procedure, or multiple CPUs may be occupied for each CSI estimation procedure. For instance, in a case where UP 615-*a* has a total CPU capability of 5 CPUs (e.g., in a given slot), UE 615-*a* may report 5 total CPUs for Uu CSI estimation procedures and sidelink estimation procedures.

In such examples (e.g., where UE 615-*a* reports a single CPU capability), UE 615-*a* may occupy the available CPUs on a FIFO basis, regardless of the link for a triggered CSI estimation procedure. For example, if UE 615-*a* triggers a first CSI estimation procedure on the sidelink, and base station 605 subsequently triggers two CSI estimation procedures, UE 615-*a* may occupy a first available CPU for the first CSI estimation procedure on the sidelink, a second available CPU for the second CSI estimation procedure on the Uu, and a third available CPU for the third CSI estimation procedure on the Uu. If UE 615-*a* triggers a sixth CSI estimation procedure (e.g., during a same TTI as five previously triggered CSI estimation procedures), then UE 615-*a* may drop the sixth CSI estimation procedure, or report stale data (e.g., regardless of whether the sixth CSI estimation procedure is for the Uu link or the sidelink). UE 615-*a* may occupy CPUs based on timing (e.g., FIFO) based on one or more rules. In some examples, base station 605 may transmit an indication of one or more CPU rules to UE 615-*a* at 620, or the one or more rules may be included in standards documents or preconfigured at UE 615-*a*, or any combination thereof. In some examples, the rules may include one or more conditions (e.g., sidelink reference signals are triggered by or otherwise known by base station 605, or UE 615-*a* reports a single CPU capability), and instructions to apply CPUs on a FIFO basis across both links if the one or more conditions are satisfied.

In some examples (e.g., where UE 615-*a* reports a single CPU capability), UE 615-*a* may occupy available CPUs based on priority of triggered CSI estimation procedures. For example, each triggered estimation procedure may be associated with a priority level. The priority level may be indicated in a message (e.g., in a sidelink reference signal request, or a separate message, or any combination thereof), or may be indicated in one or more rules (e.g., which may be indicated to UE 615-*a* at 620, standardized, preconfigured, or any combination thereof). For example, for a particular link (e.g., the Uu link), periodic CSI may have a lower priority level than aperiodic CSI. In some examples, semi-persistent CSI on a PUSCH may have a lower priority or a higher priority than other (e.g., aperiodic or periodic) CSI. For a particular link (e.g., a sidelink), different sidelink reference signals and triggered CSI estimations may be associated with different priority levels (e.g., more than 2) based on whether they are periodic, aperiodic, semi-persistent, based on timing, or any combination thereof. In some examples, one or more CPU rules may define a threshold for determining whether a sidelink CSI reporting priority is higher or lower compared with a Uu CSI reporting priority. In some examples, a priority level of a CSI estimation procedure (e.g., an aperiodic CSI on the Uu link) may be determined by a priority field in a downlink control information (DCI) message. In such examples, the one or more rules may indicate that sidelink CSI estimation procedure has a lower priority than Uu aperiodic CSI triggered by a higher priority uplink grant (e.g., via the DCI message). In some examples, the one or more rules may indicate that sidelink CSI estimation procedures may have a higher priority than a Uu aperiodic CSI triggered by a lower priority uplink grant. In some examples, priority levels may be explicit, implicit, or both. For example, the one or more rules may indicate that a Uu aperiodic CSI triggered by a high priority uplink grant may have a higher priority than any sidelink CSI, and any sidelink CSI may have a higher priority level than a low priority uplink grant. In some examples, the one or more rules may indicate one or more priority levels for sidelink CSI estimation procedures, or a single priority level for all sidelink CSI estimation procedures.

Thus, UE 615-*a* may determine which CPUs to apply to which CSI estimation procedures based on priority levels. That is, UE 615-*a* may apply a first available CPU to a triggered CSI estimation procedure that has the highest priority level, a second available CPU to a triggered CSI estimation procedure that has a next highest priority level, and so forth. If two CSI estimation procedures have a same priority level, UE 615-*a* may occupy a next available CPU with the CSI estimation procedure that was triggered first in time. If all available CPUs are occupied (e.g., for a given TTI), and another CSI estimation procedure is triggered that has a higher priority level than a CSI estimation process that is currently underway, UE 615-*a* may release a CPU (e.g. the CPU occupied with the lowest priority CSI estimation procedure) and occupy the released CPU for CSI estimation procedures on the newly triggered (e.g., higher priority) CSI estimation procedure.

In some examples, (e.g., where UE 615-*a* reports a single CPU capability), UE 615-*a* may occupy CPUs in order of time (e.g., FIFO) or based on priority, based on one or more CPU rules. Base station 605 may indicate one or more rules for the FIFO system or the priority system at 620, or the one or more CPU rules may be preconfigured or standardized. In some examples, UE 615-*a* may select the FIFO rules or the priority-based rules based on one or more conditions. For example, if UE 615-*a* is operating in mode 1, then UE 615-*a* may select the FIFO rules. If UE 615-*b* is operating in mode 2, or if CSI estimation and reporting can be triggered by another UE autonomously, then UE 615-*a* may select the priority-based rules. UE 615-*a* may then implement the selected rules. UE 615-*a* may, in some examples, apply the FIFO rules, or the priority-based rules, or may select either the FIFO rules or the priority-based rules, where UE 615-*a* reports a single CPU priority, and either reports CSI to base station 605 or utilizes CSI estimation for scheduling sidelink communications with UE 615-*b* (e.g., without reporting CSI to base station 605).

Figure 7:
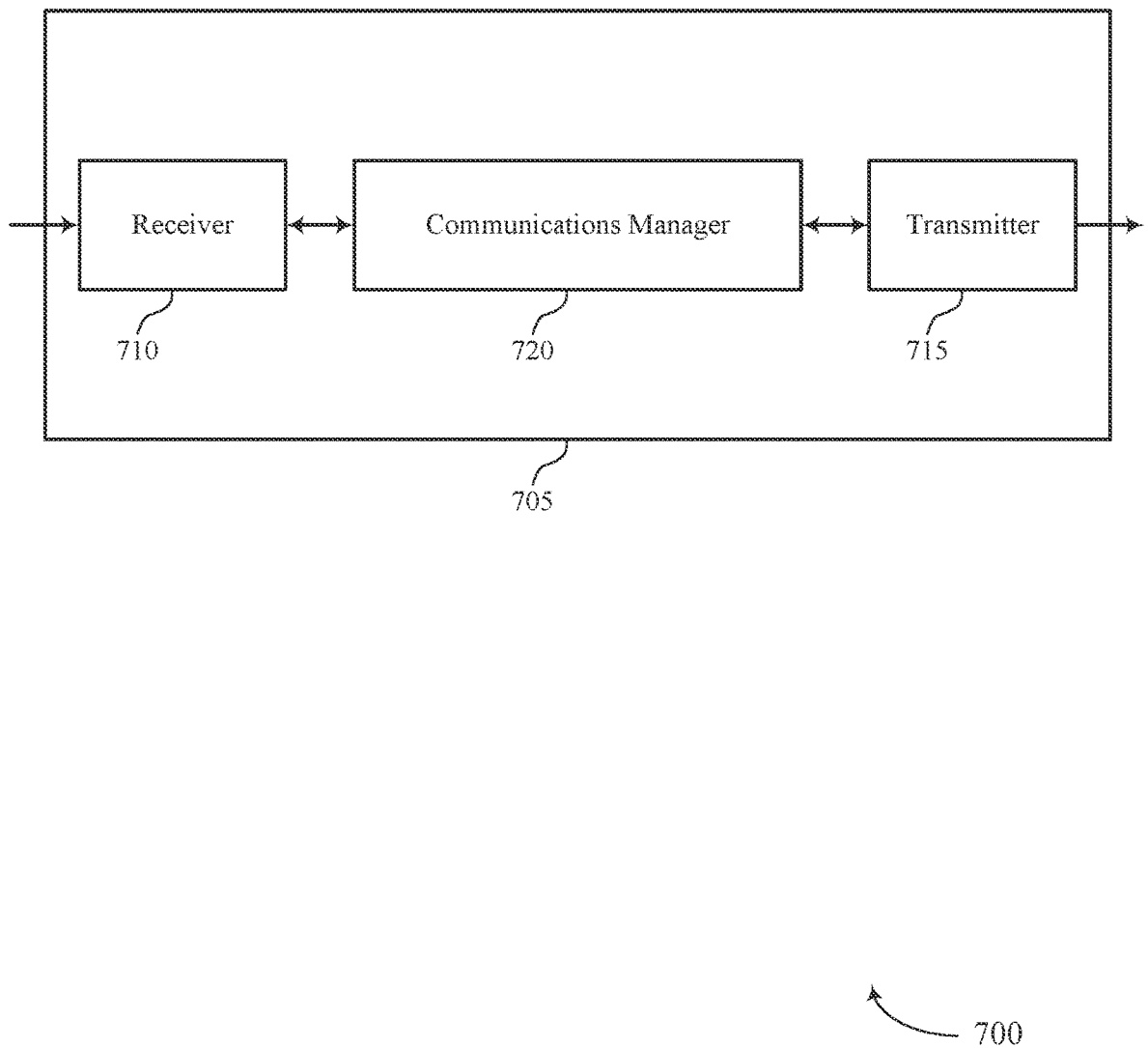
FIGS. 7 and 8 show block diagrams of devices that support channel state information for multiple communication links in accordance with aspects of the present disclosure.

FIG. 7 shows a block diagram 700 of a device 705 that supports channel state information for multiple communication links in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to channel state information for multiple communication links). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to channel state information for multiple communication links). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of channel state information for multiple communication links as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, at least one processor and memory coupled with the at least one processor may be configured to perform one or more of the functions described herein (e.g., by executing, by the at least one processor, instructions stored in the memory).

Additionally or alternatively, in some examples, the communications manager 720, the receiver 710, the transmitter 715, or various combinations or components thereof may be implemented in code (e.g., as communications management software) executed by a processor. If implemented in code executed by a processor, the functions of the communications manager 720, the receiver 710, the transmitter 715, or various combinations or components thereof may be performed by a general-purpose processor, a DSP, a central processing unit, an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a first UE in accordance with examples as disclosed herein. For example, the communications manager 720 may be configured as or otherwise support a means for communicating with a network device, such as a base station or one or more components of a base station, via a first link between the first UE and the network device. The communications manager 720 may be configured as or otherwise support a means for communicating with a second UE via a second link between the first UE and the second UE. The communications manager 720 may be configured as or otherwise support a means for transmitting, to the network device via the first link, an indication of a CSI processing capability for CSI associated with the first link and CSI associated with the second link.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for reporting CPU capability and performing CSI estimation on multiple links, resulting in improved system efficiency, more efficient application and use of computational resources, decreased system latency, improved channel quality maintenance, and improved efficiency and user experience for a user.

Figure 8:
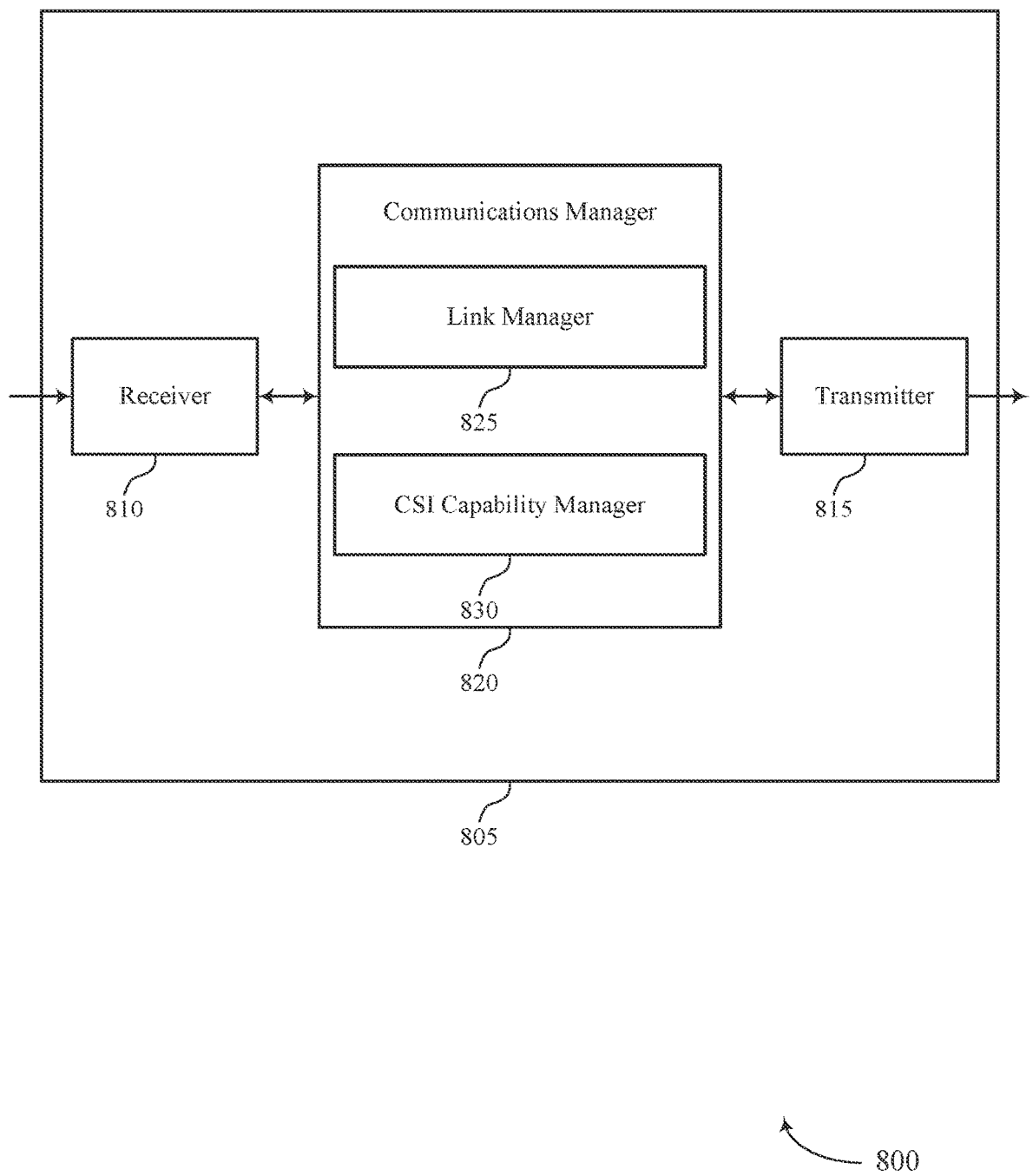

FIG. 8 shows a block diagram 800 of a device 805 that supports channel state information for multiple communication links in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to channel state information for multiple communication links). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to channel state information for multiple communication links). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of channel state information for multiple communication links as described herein. For example, the communications manager 820 may include a link manager 825 a CSI capability manager 830, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a first UE in accordance with examples as disclosed herein. The link manager 825 may be configured as or otherwise support a means for communicating with a network device via a first link between the first UE and the network device. The link manager 825 may be configured as or otherwise support a means for communicating with a second UE via a second link between the first UE and the second UE. The CSI capability manager 830 may be configured as or otherwise support a means for transmitting, to the network device via the first link, an indication of a CSI processing capability for CSI associated with the first link and CSI associated with the second link.

Figure 9:
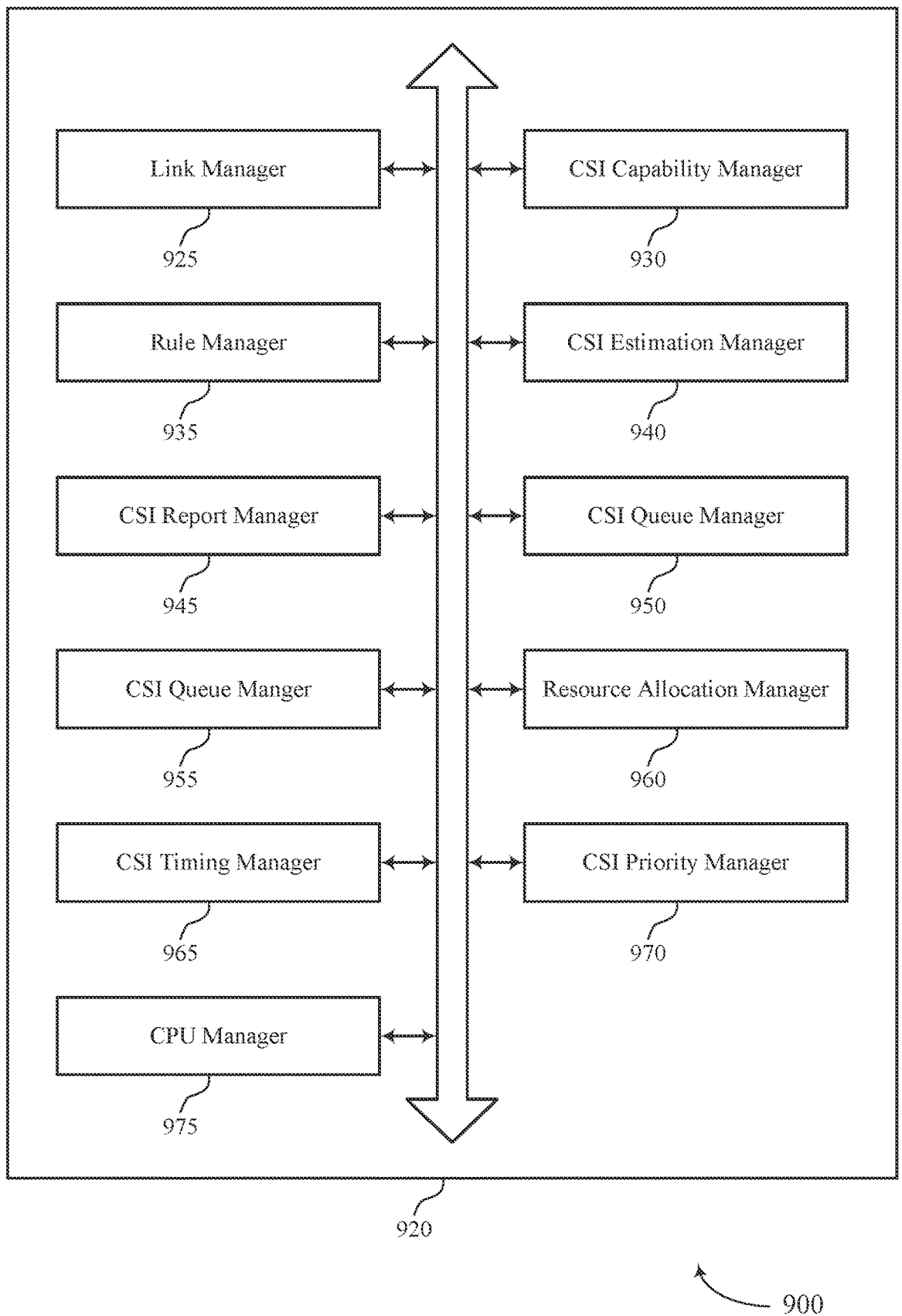
FIG. 9 shows a block diagram of a communications manager that supports channel state information for multiple communication links in accordance with aspects of the present disclosure.

FIG. 9 shows a block diagram 900 of a communications manager 920 that supports channel state information for multiple communication links in accordance with aspects of the present disclosure. The communications manager 920 may be an example of aspects of a communications manager 720, a communications manager 820, or both, as described herein. The communications manager 920, or various components thereof, may be an example of means for performing various aspects of channel state information for multiple communication links as described herein. For example, the communications manager 920 may include a link manager 925, a CSI capability manager 930, a rule manager 935, a CSI estimation manager 940, a CSI report manager 945, a CSI queue manager 950, a CSI queue manger 955, a resource allocation manager 960, a CSI timing manager 965, a CSI priority manager 970, a CPU manager 975, or any combination thereof. Each of these components may communicate, directly or indirectly, with one another (e.g., via one or more buses).

The communications manager 920 may support wireless communications at a first UE in accordance with examples as disclosed herein. The link manager 925 may be configured as or otherwise support a means for communicating with a network device, such as a base station or one or more components of a base station, via a first link between the first UE and the network device. In some examples, the link manager 925 may be configured as or otherwise support a means for communicating with a second UE via a second link between the first UE and the second UE. The CSI capability manager 930 may be configured as or otherwise support a means for transmitting, to the network device via the first link, an indication of a CSI processing capability for CSI associated with the first link and CSI associated with the second link.

In some examples, to support transmitting the indication of the CSI processing capability, the CSI capability manager 930 may be configured as or otherwise support a means for transmitting a first CSI processing capability associated with the first link and a second CSI processing capability associated with the second link, the first CSI processing capability indicating a first subset of processing units of a total number of processing units, and the second CSI processing capability indicating a second subset of processing units of the total number of processing units.

In some examples, the rule manager 935 may be configured as or otherwise support a means for receiving, from the network device, an indication of one or more rules for performing CSI estimation procedures according to the CSI processing capability.

In some examples, the CSI estimation manager 940 may be configured as or otherwise support a means for performing, according to the CSI processing capability, CSI estimation procedures associated with the first link and CSI estimation procedures associated with the second link. In some examples, the CSI report manager 945 may be configured as or otherwise support a means for generating a first CSI report for the first link and a second CSI report associated with the second link. In some examples, the CSI report manager 945 may be configured as or otherwise support a means for transmitting the first CSI report and the second CSI report to the network device via the first link.

In some examples, the CSI estimation manager 940 may be configured as or otherwise support a means for triggering a first CSI estimation procedure associated with the first link and a second CSI estimation procedure associated with the first link. In some examples, the CSI estimation manager 940 may be configured as or otherwise support a means for triggering a third CSI estimation procedure associated with the second link and a fourth CSI estimation procedure associated with the second link. In some examples, the CSI queue manager 950 may be configured as or otherwise support a means for placing the first CSI estimation procedure and the second CSI estimation procedure in a first queue for the first link. In some examples, the CSI queue manger 955 may be configured as or otherwise support a means for placing the third CSI estimation procedure and the fourth CSI estimation procedure in a second queue for the second link.

In some examples, the CPU manager 975 may be configured as or otherwise support a means for performing the first CSI estimation procedure using a first available processing unit of the first subset of processing units based on triggering the first CSI estimation procedure before triggering the second CSI estimation procedure. In some examples, the CPU manager 975 may be configured as or otherwise support a means for performing the third CSI estimation procedure using a first available processing unit of the second subset of processing units based on triggering the third CSI estimation procedure before triggering the second CSI estimation procedure.

In some examples, to support transmitting the indication of the CSI processing capability, the CSI capability manager 930 may be configured as or otherwise support a means for transmitting a CSI processing capability associated with both the first link and the second link, the CSI processing capability indicating a total number of processing units for performing CSI estimation procedures on the first link and the second link.

In some examples, the rule manager 935 may be configured as or otherwise support a means for receiving, from the network device, an indication of one or more rules for performing CSI estimation procedures according to the CSI processing capability.

In some examples, the CSI estimation manager 940 may be configured as or otherwise support a means for performing, according to the CSI processing capability, CSI estimation procedures associated with the first link and CSI estimation procedures associated with the second link. In some examples, the CSI report manager 945 may be configured as or otherwise support a means for generating a first CSI report for the first link and a second CSI report associated with the second link. In some examples, the CSI report manager 945 may be configured as or otherwise support a means for transmitting the first CSI report and the second CSI report to the network device via the first link.

In some examples, the CSI estimation manager 940 may be configured as or otherwise support a means for performing, according to the CSI processing capability, CSI estimation procedures for the first link and CSI estimation procedures associated with the second link. In some examples, the resource allocation manager 960 may be configured as or otherwise support a means for allocating resources for the second UE on the second link based on the CSI estimation.

In some examples, the CSI estimation manager 940 may be configured as or otherwise support a means for initiating a first CSI estimation procedure associated with the first link and a second CSI estimation procedure associated with the second link. In some examples, the CSI timing manager 965 may be configured as or otherwise support a means for selecting the first CSI estimation procedure or the second CSI estimation procedure based on which of the first CSI estimation procedure and the second CSI estimation procedure is triggered first in time. In some examples, the CSI timing manager 965 may be configured as or otherwise support a means for performing the selected CSI estimation procedure using a first available processing unit of the total number of processing units.

In some examples, the CSI estimation manager 940 may be configured as or otherwise support a means for triggering a first CSI estimation procedure associated with the first link and a second CSI estimation procedure associated with the second link. In some examples, the CSI priority manager 970 may be configured as or otherwise support a means for comparing a first priority level associated with the first CSI estimation procedure with a second priority level associated with the second CSI estimation procedure. In some examples, the CSI priority manager 970 may be configured as or otherwise support a means for selecting, based on the comparing, the first CSI estimation procedure or the second CSI estimation procedure. In some examples, the CSI estimation manager 940 may be configured as or otherwise support a means for performing the selected CSI estimation procedure using a first available processing unit of the total number of processing units.

In some examples, the CSI priority manager 970 may be configured as or otherwise support a means for determining, based on the comparing, that the first priority level and the second priority level are the same. In some examples, the CPU manager 975 may be configured as or otherwise support a means for determining, based on the first priority level and the second priority level being the same, which of the first CSI estimation procedure and the second CSI estimation procedure is triggered first in time, where using the first available processing unit of the total number of processing units to perform the first CSI estimation procedure or the second CSI estimation procedure is based on determining which of the first CSI estimation procedure and the second estimation procedure is triggered first in time.

In some examples, the CSI estimation manager 940 may be configured as or otherwise support a means for triggering a third CSI estimation procedure associated with the first link or the second link, where the third CSI estimation procedure is associated with a third priority level. In some examples, the CSI estimation manager 940 may be configured as or otherwise support a means for initiating the third CSI estimation procedure using a second available processing unit of the total number of processing units. In some examples, the CSI estimation manager 940 may be configured as or otherwise support a means for triggering a fourth CSI estimation procedure associated with the first link or the second link, where the fourth CSI estimation procedure is associated with a fourth priority level that is higher than the third priority level. In some examples, the CPU manager 975 may be configured as or otherwise support a means for releasing the second available processing unit from the third CSI estimation procedure. In some examples, the CPU manager 975 may be configured as or otherwise support a means for initiating the fourth CSI estimation procedure using the released second available processing unit.

Figure 10:
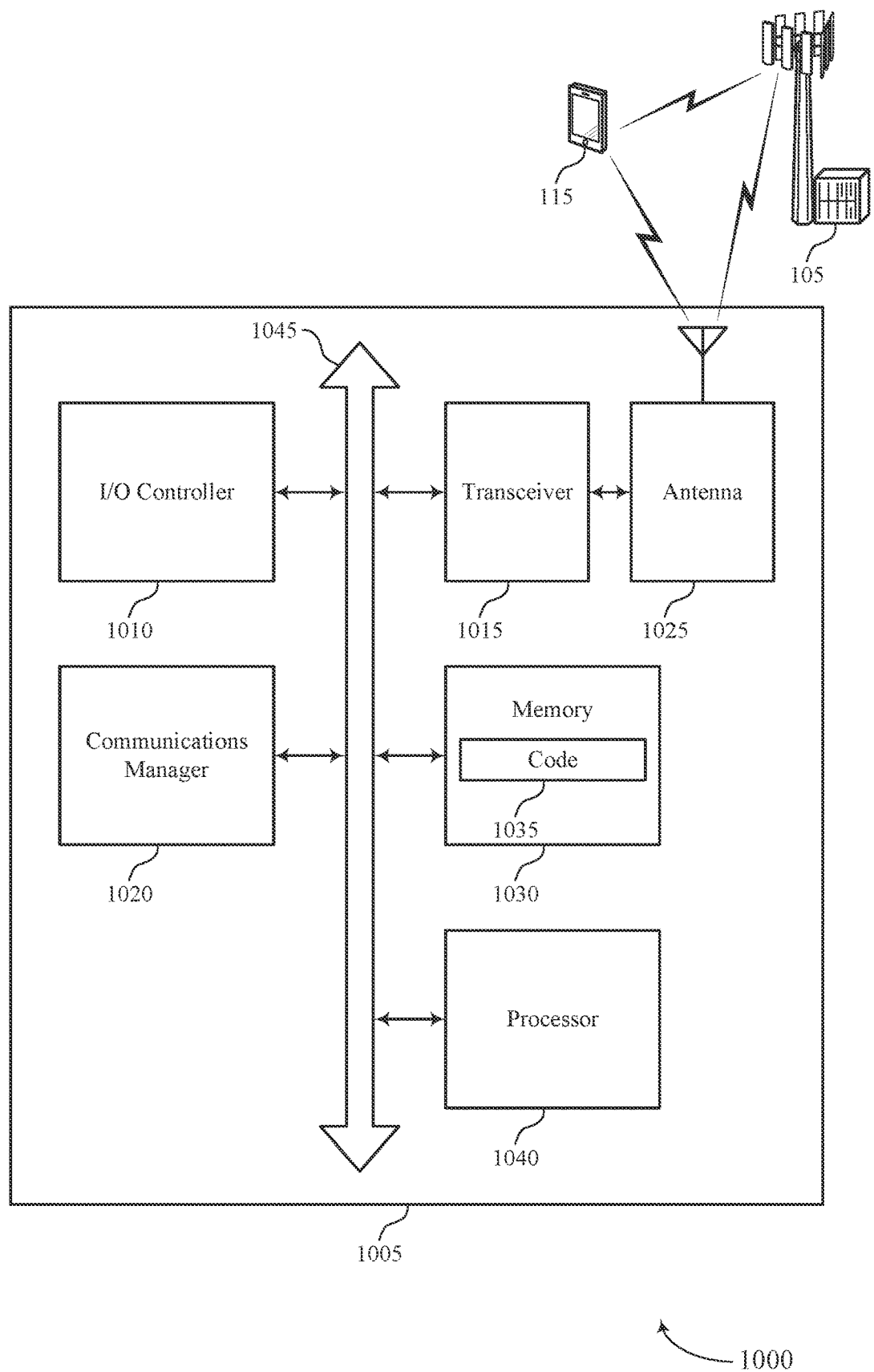
FIG. 10 shows a diagram of a system including a device that supports channel state information for multiple communication links in accordance with aspects of the present disclosure.

FIG. 10 shows a diagram of a system 1000 including a device 1005 that supports channel state information for multiple communication links in accordance with aspects of the present disclosure. The device 1005 may be an example of or include the components of a device 705, a device 805, or a UE 115 as described herein. The device 1005 may communicate wirelessly with one or more base stations 105 (which may be examples of network devices), UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a central processing unit, a GPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting channel state information for multiple communication links). For example, the device 1005 or a component of the device 1005 may include a processor 1040 and memory 1030 coupled to the processor 1040, the processor 1040 and memory 1030 configured to perform various functions described herein.

The communications manager 1020 may support wireless communications at a first UE in accordance with examples as disclosed herein. For example, the communications manager 1020 may be configured as or otherwise support a means for communicating with a network device, such as a base station or one or more components of a base station, via a first link between the first UE and the network device. The communications manager 1020 may be configured as or otherwise support a means for communicating with a second UE via a second link between the first UE and the second UE. The communications manager 1020 may be configured as or otherwise support a means for transmitting, to the network device via the first link, an indication of a CSI processing capability for CSI associated with the first link and CSI associated with the second link.

By including or configuring the communications manager 1020 in accordance with examples as described herein, the device 1005 may support techniques for reporting CPU capability and performing CSI estimation on multiple links, resulting in improved system efficiency, more efficient application and use of computational resources, decreased system latency, improved channel quality maintenance, and improved efficiency and user experience for a user.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of channel state information for multiple communication links as described herein, or the processor 1040 and the memory 1030 may be otherwise configured to perform or support such operations.

Figure 11:
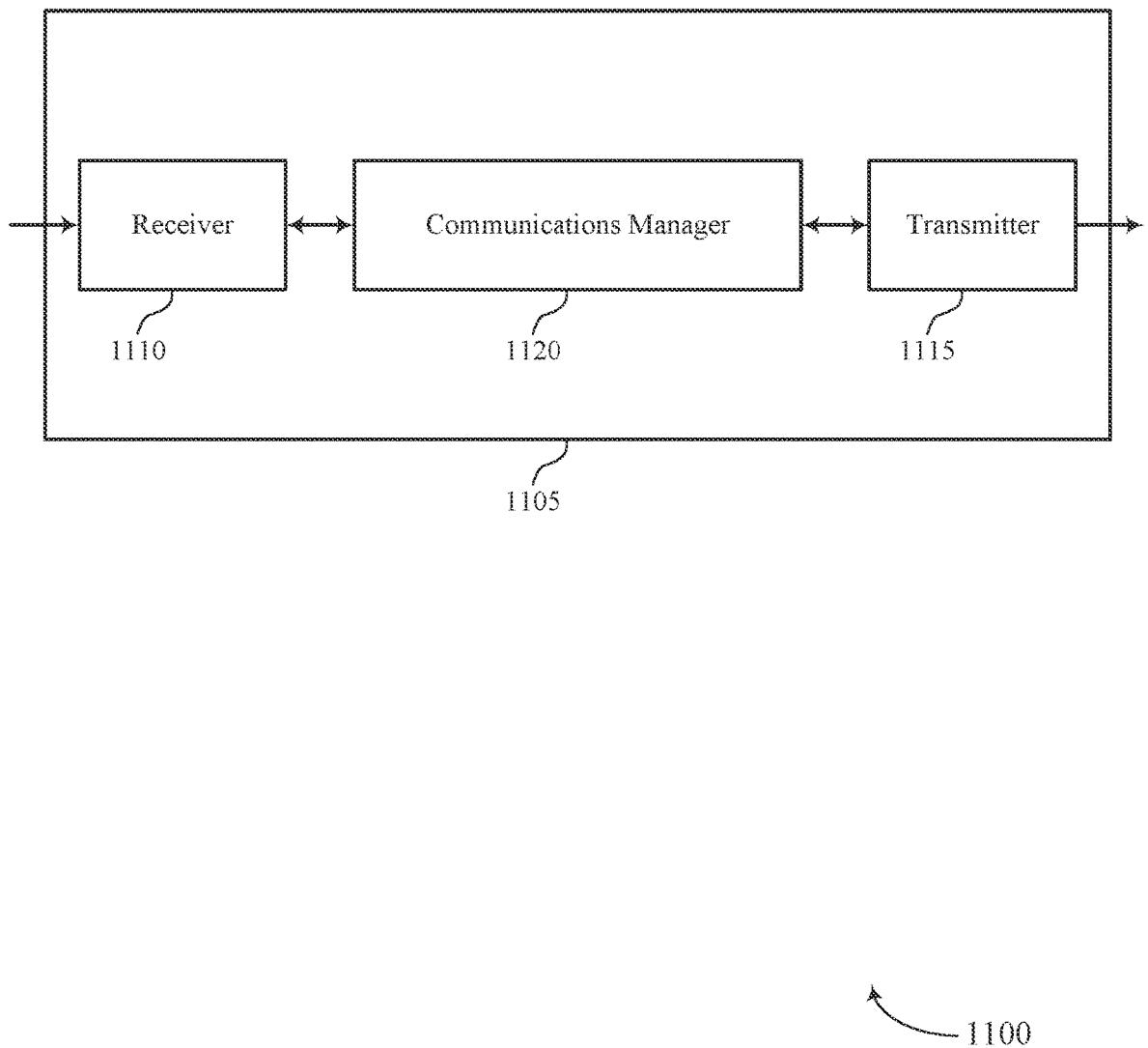
FIGS. 11 and 12 show block diagrams of devices that support channel state information for multiple communication links in accordance with aspects of the present disclosure.

FIG. 11 shows a block diagram 1100 of a device 1105 that supports channel state information for multiple communication links in accordance with aspects of the present disclosure. The device 1105 may be an example of aspects of a base station 105 (which may be an example of a network device), as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to channel state information for multiple communication links). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to channel state information for multiple communication links). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of channel state information for multiple communication links as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, at least one processor and memory coupled with the at least one processor may be configured to perform one or more of the functions described herein (e.g., by executing, by the at least one processor, instructions stored in the memory).

Additionally or alternatively, in some examples, the communications manager 1120, the receiver 1110, the transmitter 1115, or various combinations or components thereof may be implemented in code (e.g., as communications management software) executed by a processor. If implemented in code executed by a processor, the functions of the communications manager 1120, the receiver 1110, the transmitter 1115, or various combinations or components thereof may be performed by a general-purpose processor, a DSP, a central processing unit, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a network device, such as a base station or one or more components of a base station, in accordance with examples as disclosed herein. For example, the communications manager 1120 may be configured as or otherwise support a means for communicating with a first UE via a first link between the network device and the first UE. The communications manager 1120 may be configured as or otherwise support a means for receiving, from the first UE via the first link, an indication of a CSI processing capability of the first UE, for CSI associated with the first link and CSI associated with a second link between the first UE and a second UE. The communications manager 1120 may be configured as or otherwise support a means for triggering one or more CSI estimation procedures for the first UE, the second UE, or both, based on receiving the indication of the CSI processing capability.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for reporting CPU capability and performing CSI estimation on multiple links, resulting in improved system efficiency, more efficient application and use of computational resources, decreased system latency, improved channel quality maintenance, and improved efficiency and user experience for a user.

Figure 12:
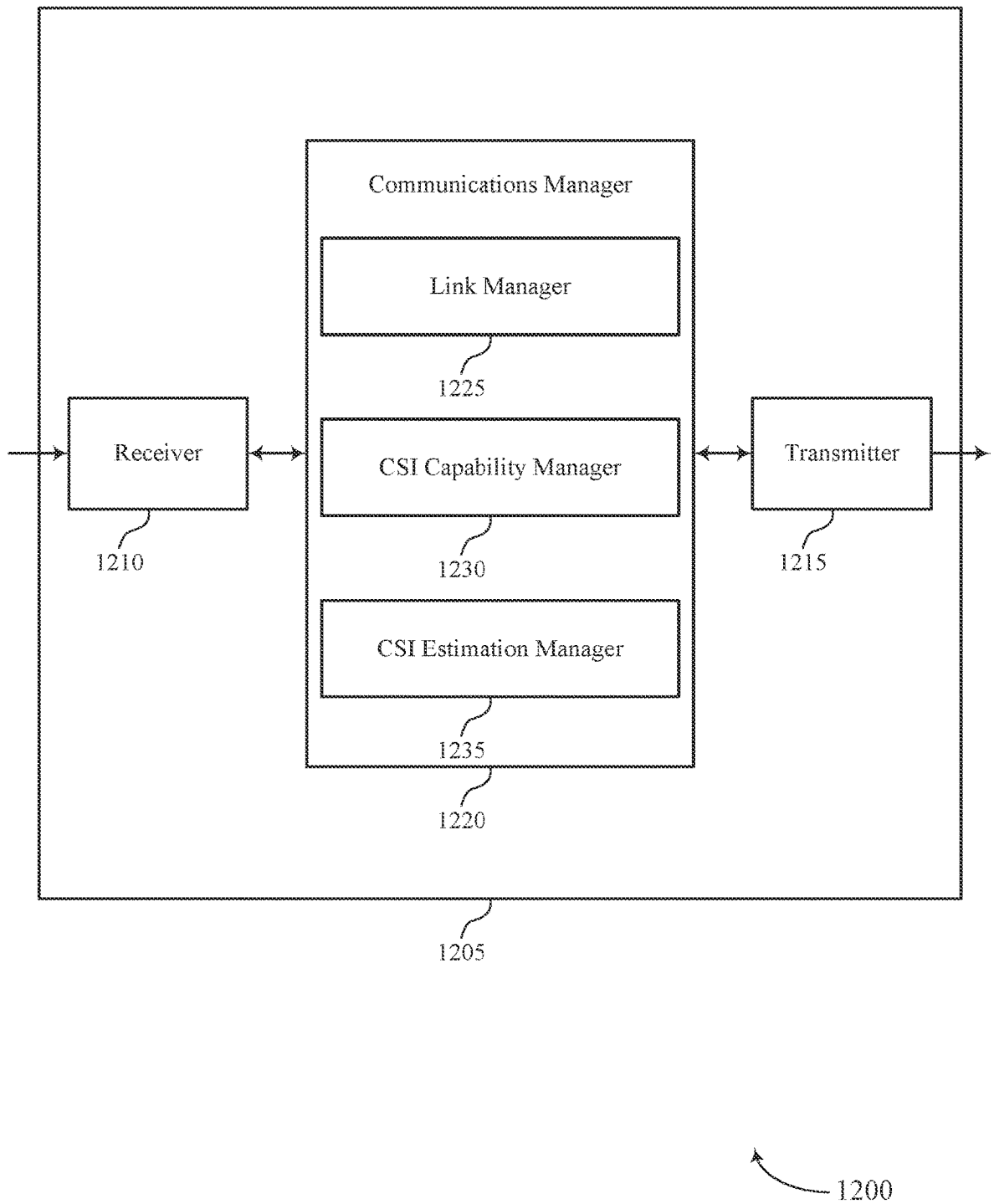

FIG. 12 shows a block diagram 1200 of a device 1205 that supports channel state information for multiple communication links in accordance with aspects of the present disclosure. The device 1205 may be an example of aspects of a device 1105 or a base station 105 (which may be an example of a network device), as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to channel state information for multiple communication links). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to channel state information for multiple communication links). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of channel state information for multiple communication links as described herein. For example, the communications manager 1220 may include a link manager 1225, a CSI capability manager 1230, a CSI estimation manager 1235, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communications at a network device, such as a base station or one or more components of a base station, in accordance with examples as disclosed herein. The link manager 1225 may be configured as or otherwise support a means for communicating with a first UE via a first link between the network device and the first UE. The CSI capability manager 1230 may be configured as or otherwise support a means for receiving, from the first UE via the first link, an indication of a CSI processing capability of the first UE, for CSI associated with the first link and CSI associated with a second link between the first UE and a second UE. The CSI estimation manager 1235 may be configured as or otherwise support a means for triggering one or more CSI estimation procedures for the first UE, the second UE, or both, based on receiving the indication of the CSI processing capability.

Figure 13:
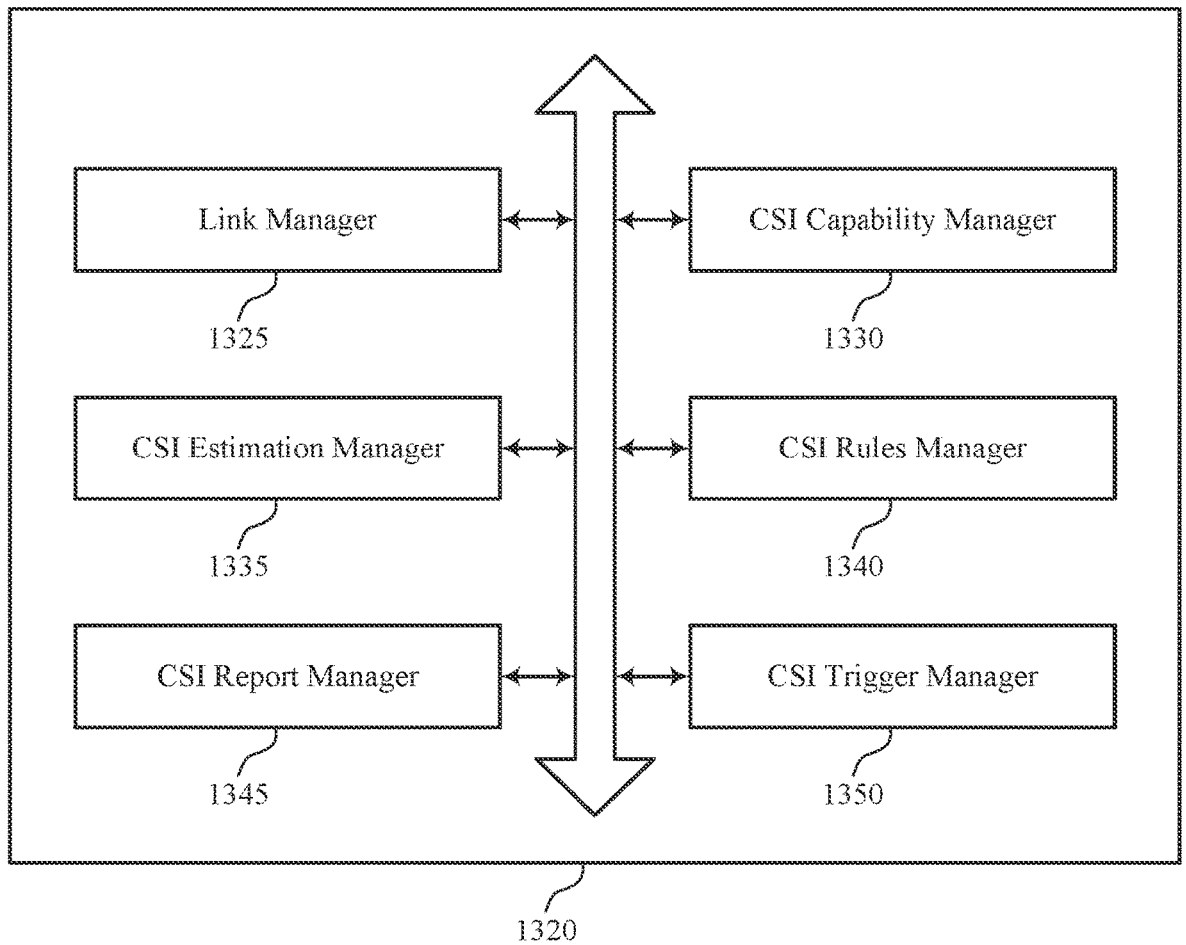
FIG. 13 shows a block diagram of a communications manager that supports channel state information for multiple communication links in accordance with aspects of the present disclosure.

FIG. 13 shows a block diagram 1300 of a communications manager 1320 that supports channel state information for multiple communication links in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of channel state information for multiple communication links as described herein. For example, the communications manager 1320 may include a link manager 1325, a CSI capability manager 1330, a CSI estimation manager 1335, a CSI rules manager 1340, a CSI report manager 1345, a CSI trigger manager 1350, or any combination thereof. Each of these components may communicate, directly or indirectly, with one another (e.g., via one or more buses).

The communications manager 1320 may support wireless communications at a network device, such as a base station or one or more components of a base station, in accordance with examples as disclosed herein. The link manager 1325 may be configured as or otherwise support a means for communicating with a first UE via a first link between the network device and the first UE. The CSI capability manager 1330 may be configured as or otherwise support a means for receiving, from the first UE via the first link, an indication of a CSI processing capability of the first UE, for CSI associated with the first link and CSI associated with a second link between the first UE and a second UE. The CSI estimation manager 1335 may be configured as or otherwise support a means for triggering one or more CSI estimation procedures for the first UE, the second UE, or both, based on receiving the indication of the CSI processing capability.

In some examples, to support receiving the indication of the CSI processing capability, the CSI capability manager 1330 may be configured as or otherwise support a means for receiving a first CSI processing capability associated with the first link and a second CSI processing capability associated with the second link, the first CSI processing capability indicating a first subset of processing units of a total number of processing units at the UE, and the second CSI processing capability indicating a second subset of processing units of the total number of processing units at the UE.

In some examples, the CSI rules manager 1340 may be configured as or otherwise support a means for transmitting, to the UE, an indication of one or more rules for performing CSI estimation procedures according to the CSI processing capability.

In some examples, the CSI report manager 1345 may be configured as or otherwise support a means for receiving, from the UE, a first CSI report associated with the first link and a second CSI report for the second link.

In some examples, the CSI trigger manager 1350 may be configured as or otherwise support a means for transmitting, to the first UE, a first trigger for one or more CSI estimation procedures associated with the first link. In some examples, the CSI trigger manager 1350 may be configured as or otherwise support a means for transmitting, to the first UE, the second UE, or both, a trigger for one or more CSI estimation procedures associated with the second link.

In some examples, to support receiving the indication of the CSI processing capability, the CSI capability manager 1330 may be configured as or otherwise support a means for receiving a CSI processing capability associated with both the first link and the second link, the CSI processing capability indicating a total number of processing units for performing, by the first UE, CSI estimation procedures on the first link and the second link.

In some examples, the CSI rules manager 1340 may be configured as or otherwise support a means for transmitting, to the first UE, an indication of one or more rules for performing CSI estimation procedures according to the CSI processing capability.

In some examples, the CSI report manager 1345 may be configured as or otherwise support a means for receiving, from the UE based on the CSI processing capability, a first CSI report for the first link and a second CSI report for the second link.

Figure 14:
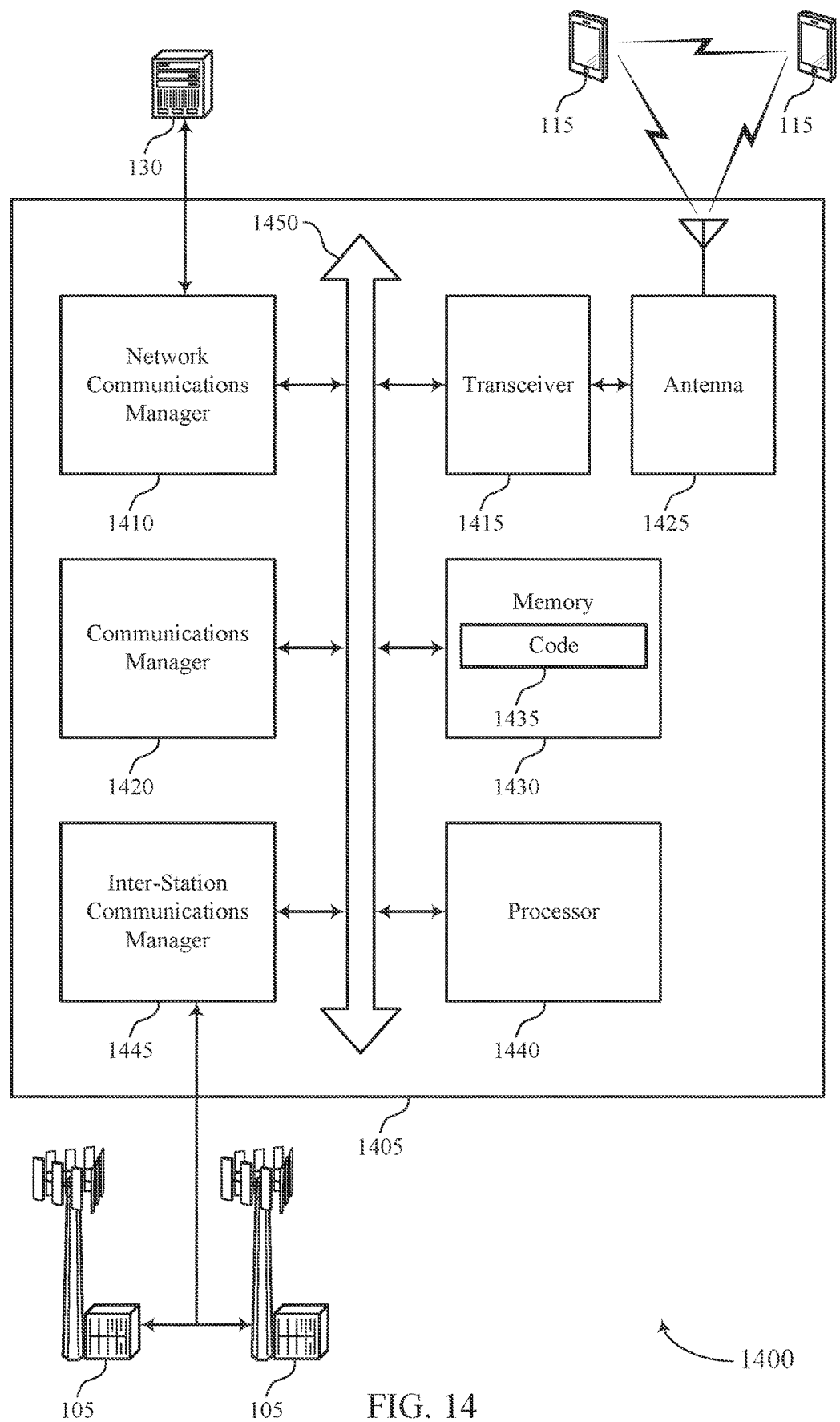
FIG. 14 shows a diagram of a system including a device that supports channel state information for multiple communication links in accordance with aspects of the present disclosure.

FIG. 14 shows a diagram of a system 1400 including a device 1405 that supports channel state information for multiple communication links in accordance with aspects of the present disclosure. The device 1405 may be an example of or include the components of a device 1105, a device 1205, or a base station 105 (which may be an example of a network device), as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a central processing unit, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting channel state information for multiple communication links). For example, the device 1405 or a component of the device 1405 may include a processor 1440 and memory 1430 coupled to the processor 1440, the processor 1440 and memory 1430 configured to perform various functions described herein.

The inter-station communications manager 1445 may manage communications with other base stations 105, and may include a controller or scheduler for controlling communications with UEs 115 in cooperation with other base stations 105 (which may be examples of network devices). For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The communications manager 1420 may support wireless communications at a network device, such as a base station or one or more components of a base station, in accordance with examples as disclosed herein. For example, the communications manager 1420 may be configured as or otherwise support a means for communicating with a first UE via a first link between the network device and the first UE. The communications manager 1420 may be configured as or otherwise support a means for receiving, from the first UE via the first link, an indication of a CSI processing capability of the first UE, for CSI associated with the first link and CSI associated with a second link between the first UE and a second UE. The communications manager 1420 may be configured as or otherwise support a means for triggering one or more CSI estimation procedures for the first UE, the second UE, or both, based on receiving the indication of the CSI processing capability.

By including or configuring the communications manager 1420 in accordance with examples as described herein, the device 1405 may support techniques for reporting CPU capability and performing CSI estimation on multiple links, resulting in improved system efficiency, more efficient application and use of computational resources, decreased system latency, improved channel quality maintenance, and improved efficiency and user experience for a user.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of channel state information for multiple communication links as described herein, or the processor 1440 and the memory 1430 may be otherwise configured to perform or support such operations.

Figure 15:
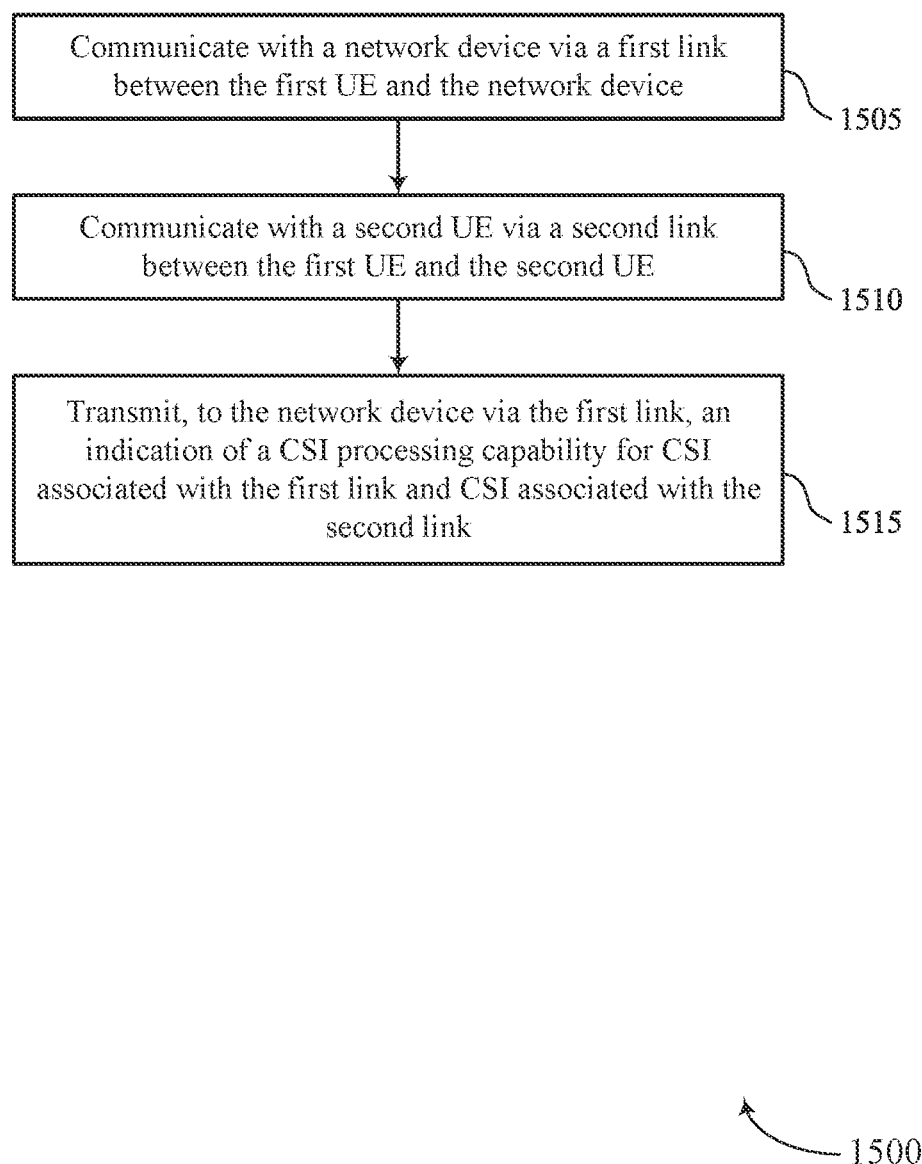
FIGS. 15 through 18 show flowcharts illustrating methods that support channel state information for multiple communication links in accordance with aspects of the present disclosure.

FIG. 15 shows a flowchart illustrating a method 1500 that supports channel state information for multiple communication links in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1505, the method may include communicating with a network device, such as a base station or one or more components of a base station, via a first link between the first UE and the network device. The operations of 1505 may be performed in accordance with examples as disclosed herein. In some examples, aspects of the operations of 1505 may be performed by a link manager 925 as described with reference to FIG. 9.

At 1510, the method may include communicating with a second UE via a second link between the first UE and the second UE. The operations of 1510 may be performed in accordance with examples as disclosed herein. In some examples, aspects of the operations of 1510 may be performed by a link manager 925 as described with reference to FIG. 9.

At 1515, the method may include transmitting, to the network device via the first link, an indication of a CSI processing capability for CSI associated with the first link and CSI associated with the second link. The operations of 1515 may be performed in accordance with examples as disclosed herein. In some examples, aspects of the operations of 1515 may be performed by a CSI capability manager 930 as described with reference to FIG. 9.

Figure 16:
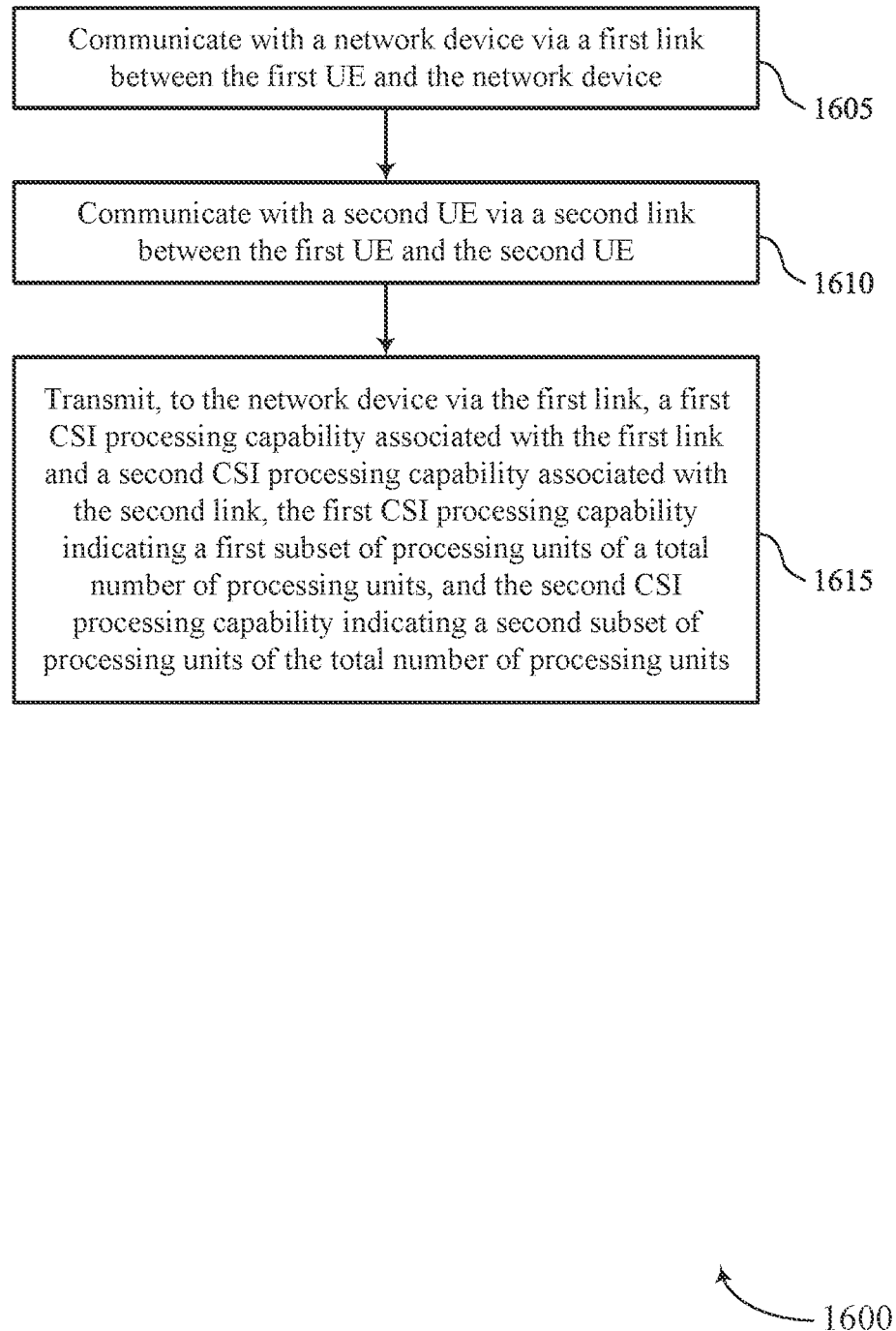

FIG. 16 shows a flowchart illustrating a method 1600 that supports channel state information for multiple communication links in accordance with aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1605, the method may include communicating with a network device via a first link between the first UE and the network device. The operations of 1605 may be performed in accordance with examples as disclosed herein. In some examples, aspects of the operations of 1605 may be performed by a link manager 925 as described with reference to FIG. 9.

At 1610 the method may include communicating with a second UE via a second link between the first UE and the second UE. The operations of 1610 may be performed in accordance with examples as disclosed herein. In some examples, aspects of the operations of 1610 may be performed by a link manager 925 as described with reference to FIG. 9.

At 1615, the method may include transmitting, to the network device via the first link, a first CSI processing capability associated with the first link and a second CSI processing capability associated with the second link, the first CSI processing capability indicating a first subset of processing units of a total number of processing units, and the second CSI processing capability indicating a second subset of processing units of the total number of processing units. The operations of 1615 may be performed in accordance with examples as disclosed herein. In some examples, aspects of the operations of 1615 may be performed by a CSI capability manager 930 as described with reference to FIG. 9.

Figure 17:
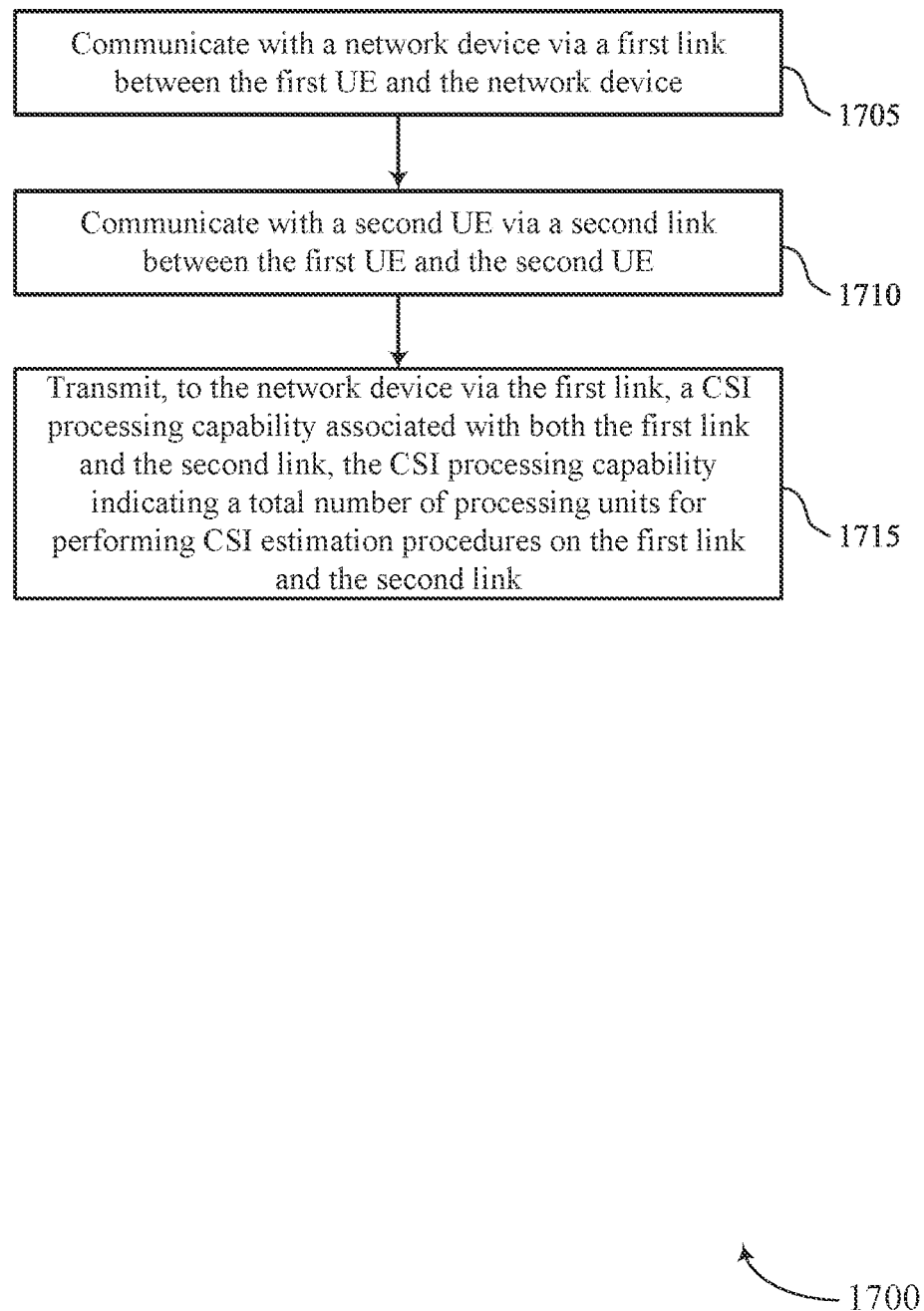

FIG. 17 shows a flowchart illustrating a method 1700 that supports channel state information for multiple communication links in accordance with aspects of the present disclosure. The operations of the method 1700 may be implemented by a UE or its components as described herein. For example, the operations of the method 1700 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1705, the method may include communicating with a network device, such as a base station or one or more components of a base station, via a first link between the first UE and the network device. The operations of 1705 may be performed in accordance with examples as disclosed herein. In some examples, aspects of the operations of 1705 may be performed by a link manager 925 as described with reference to FIG. 9.

At 1710, the method may include communicating with a second UE via a second link between the first UE and the second UE. The operations of 1710 may be performed in accordance with examples as disclosed herein. In some examples, aspects of the operations of 1710 may be performed by a link manager 925 as described with reference to FIG. 9.

At 1715, the method may include transmitting, to the network device via the first link, an indication of a CSI processing capability for CSI associated with the first link and CSI associated with the second link. The operations of 1715 may be performed in accordance with examples as disclosed herein. In some examples, aspects of the operations of 1715 may be performed by a CSI capability manager 930 as described with reference to FIG. 9.

At 1715, the method may include transmitting, to the network device via the first link, an indication of a CSI processing capability associated with both the first link and the second link, the CSI processing capability indicating a total number of processing units for performing CSI estimation procedures on the first link and the second link. The operations of 1715 may be performed in accordance with examples as disclosed herein. In some examples, aspects of the operations of 1715 may be performed by a CSI capability manager 930 as described with reference to FIG. 9.

Figure 18:
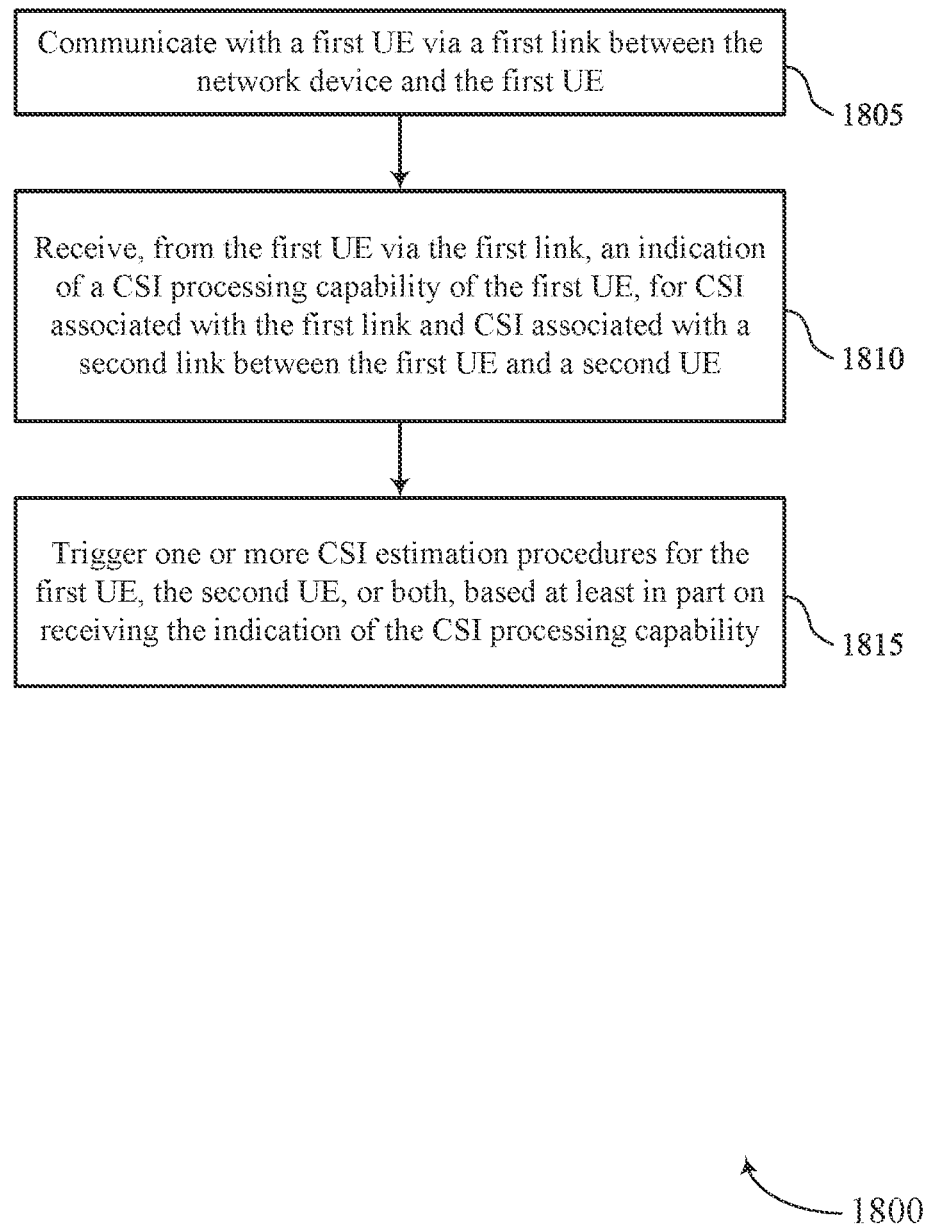

FIG. 18 shows a flowchart illustrating a method 1800 that supports channel state information for multiple communication links in accordance with aspects of the present disclosure. The operations of the method 1800 may be implemented by a network device, such as a base station or one or more components of a base station, or its components as described herein. For example, the operations of the method 1800 may be performed by a base station 105 as described with reference to FIGS. 1 through 6 and 11 through 14. In some examples, a network device may execute a set of instructions to control the functional elements of the network device to perform the described functions. Additionally or alternatively, the network device may perform aspects of the described functions using special-purpose hardware.

At 1805, the method may include communicating with a first UE via a first link between the network device and the first UE. The operations of 1805 may be performed in accordance with examples as disclosed herein. In some examples, aspects of the operations of 1805 may be performed by a link manager 1325 as described with reference to FIG. 13.

At 1810, the method may include receiving, from the first UE via the first link, an indication of a CSI processing capability of the first UE, for CSI associated with the first link and CSI associated with a second link between the first UE and a second UE. The operations of 1810 may be performed in accordance with examples as disclosed herein. In some examples, aspects of the operations of 1810 may be performed by a CSI capability manager 1330 as described with reference to FIG. 13.

At 1815, the method may include triggering one or more CSI estimation procedures for the first UE, the second UE, or both, based on receiving the indication of the CSI processing capability. The operations of 1815 may be performed in accordance with examples as disclosed herein. In some examples, aspects of the operations of 1815 may be performed by a CSI estimation manager 1335 as described with reference to FIG. 13.

The following provides an overview of aspects of the present disclosure:

Aspect 1: A method for wireless communications at a first UE, comprising: communicating with a network device via a first link between the first UE and the network device; communicating with a second UE via a second link between the first UE and the second UE; transmitting, to the network device via the first link, an indication of a CSI processing capability for CSI associated with the first link and CSI associated with the second link.

Aspect 2: The method of aspect 1, wherein transmitting the indication of the CSI processing capability comprises: transmitting a first CSI processing capability associated with the first link and a second CSI processing capability associated with the second link, the first CSI processing capability indicating a first subset of processing units of a total number of processing units, and the second CSI processing capability indicating a second subset of processing units of the total number of processing units.

Aspect 3: The method of aspect 2, further comprising: receiving, from the network device, an indication of one or more rules for performing CSI estimation procedures according to the CSI processing capability.

Aspect 4: The method of any of aspects 2 through 3, further comprising: performing, according to the CSI processing capability, CSI estimation procedures associated with the first link and CSI estimation procedures associated with the second link; generating a first CSI report for the first link and a second CSI report associated with the second link; and transmitting the first CSI report and the second CSI report to the network device via the first link.

Aspect 5: The method of any of aspects 2 through 4, further comprising: triggering a first CSI estimation procedure associated with the first link and a second CSI estimation procedure associated with the first link; triggering a third CSI estimation procedure associated with the second link and a fourth CSI estimation procedure associated with the second link placing the first CSI estimation procedure and the second CSI estimation procedure in a first queue for the first link; and placing the third CSI estimation procedure and the fourth CSI estimation procedure in a second queue for the second link.

Aspect 6: The method of aspect 5, further comprising: performing the first CSI estimation procedure using a first available processing unit of the first subset of processing units based at least in part on triggering the first CSI estimation procedure before triggering the second CSI estimation procedure; and performing the third CSI estimation procedure using a first available processing unit of the second subset of processing units based at least in part on triggering the third CSI estimation procedure before triggering the second CSI estimation procedure.

Aspect 7: The method of any of aspects 1 through 6, wherein transmitting the indication of the CSI processing capability comprises: transmitting a CSI processing capability associated with both the first link and the second link, the CSI processing capability indicating a total number of processing units for performing CSI estimation procedures on the first link and the second link.

Aspect 8: The method of aspect 7, further comprising: receiving, from the network device, an indication of one or more rules for performing CSI estimation procedures according to the CSI processing capability.

Aspect 9: The method of any of aspects 7 through 8, further comprising: performing, according to the CSI processing capability, CSI estimation procedures associated with the first link and CSI estimation procedures associated with the second link; generating a first CSI report for the first link and a second CSI report associated with the second link; and transmitting the first CSI report and the second CSI report to the network device via the first link.

Aspect 10: The method of any of aspects 7 through 9, further comprising: performing, according to the CSI processing capability, CSI estimation procedures for the first link and CSI estimation procedures associated with the second link; allocating resources for the second UE on the second link based at least in part on the CSI estimation.

Aspect 11: The method of any of aspects 7 through 10, further comprising: initiating a first CSI estimation procedure associated with the first link and a second CSI estimation procedure associated with the second link; selecting the first CSI estimation procedure or the second CSI estimation procedure based at least in part on which of the first CSI estimation procedure and the second CSI estimation procedure is triggered first in time; and performing the selected CSI estimation procedure using a first available processing unit of the total number of processing units.

Aspect 12: The method of any of aspects 7 through 11, further comprising: triggering a first CSI estimation procedure associated with the first link and a second CSI estimation procedure associated with the second link; comparing a first priority level associated with the first CSI estimation procedure with a second priority level associated with the second CSI estimation procedure; selecting, based at least in part on the comparing, the first CSI estimation procedure or the second CSI estimation procedure; and performing the selected CSI estimation procedure using a first available processing unit of the total number of processing units.

Aspect 13: The method of aspect 12, further comprising: determining, based at least in part on the comparing, that the first priority level and the second priority level are the same; determining, based at least in part on the first priority level and the second priority level being the same, which of the first CSI estimation procedure and the second CSI estimation procedure is triggered first in time, wherein using the first available processing unit of the total number of processing units to perform the first CSI estimation procedure or the second CSI estimation procedure is based at least in part on determining which of the first CSI estimation procedure and the second estimation procedure is triggered first in time.

Aspect 14: The method of any of aspects 12 through 13, further comprising: triggering a third CSI estimation procedure associated with the first link or the second link, wherein the third CSI estimation procedure is associated with a third priority level; initiating the third CSI estimation procedure using a second available processing unit of the total number of processing units; triggering a fourth CSI estimation procedure associated with the first link or the second link, wherein the fourth CSI estimation procedure is associated with a fourth priority level that is higher than the third priority level; releasing the second available processing unit from the third CSI estimation procedure; and initiating the fourth CSI estimation procedure using the released second available processing unit.

Aspect 15: A method for wireless communications at a network device, comprising: communicating with a first UE via a first link between the network device and the first UE; receiving, from the first UE via the first link, an indication of a CSI processing capability of the first UE, for CSI associated with the first link and CSI associated with a second link between the first UE and a second UE; triggering one or more CSI estimation procedures for the first UE, the second UE, or both, based at least in part on receiving the indication of the CSI processing capability.

Aspect 16: The method of aspect 15, wherein receiving the indication of the CSI processing capability comprises: receiving a first CSI processing capability associated with the first link and a second CSI processing capability associated with the second link, the first CSI processing capability indicating a first subset of processing units of a total number of processing units at the UE, and the second CSI processing capability indicating a second subset of processing units of the total number of processing units at the UE.

Aspect 17: The method of aspect 16, further comprising: transmitting, to the UE, an indication of one or more rules for performing CSI estimation procedures according to the CSI processing capability.

Aspect 18: The method of any of aspects 16 through 17, further comprising: receiving, from the UE, a first CSI report associated with the first link and a second CSI report for the second link.

Aspect 19: The method of any of aspects 16 through 18, further comprising: transmitting, to the first UE, a first trigger for one or more CSI estimation procedures associated with the first link; and transmitting, to the first UE, the second UE, or both, a trigger for one or more CSI estimation procedures associated with the second link.

Aspect 20: The method of any of aspects 15 through 19, wherein receiving the indication of the CSI processing capability comprises: receiving a CSI processing capability associated with both the first link and the second link, the CSI processing capability indicating a total number of processing units for performing, by the first UE, CSI estimation procedures on the first link and the second link.

Aspect 21: The method of aspect 20, further comprising: transmitting, to the first UE, an indication of one or more rules for performing CSI estimation procedures according to the CSI processing capability.

Aspect 22: The method of any of aspects 20 through 21, further comprising: receiving, from the UE based at least in part on the CSI processing capability, a first CSI report for the first link and a second CSI report for the second link.

Aspect 23: An apparatus for wireless communications at a first UE, comprising at least one processor; memory coupled with the at least one processor; and instructions stored in the memory and executable by the at least one processor to cause the apparatus to perform a method of any of aspects 1 through 14.

Aspect 24: An apparatus for wireless communications at a first UE, comprising at least one means for performing a method of any of aspects 1 through 14.

Aspect 25: A nontransitory computer-readable medium storing code for wireless communications at a first UE, the code comprising instructions executable by at least one processor to perform a method of any of aspects 1 through 14.

Aspect 26: An apparatus for wireless communications at a network device, comprising at least one processor; memory coupled with the at least one processor; and instructions stored in the memory and executable by the at least one processor to cause the apparatus to perform a method of any of aspects 15 through 22.

Aspect 27: An apparatus for wireless communications at a network device, comprising at least one means for performing a method of any of aspects 15 through 22.

Aspect 28: A non-transitory computer-readable medium storing code for wireless communications at a network device, the code comprising instructions executable by at least one processor to perform a method of any of aspects 15 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies, including future systems and radio technologies, not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a central processing unit, a GPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g. a combination of a DSP and a microprocessor, multiple microprocessors, one or more microprocessors in conjunction with a DSP core, or any other such configuration).

The functions described herein may be implemented in hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B. or C means A or B or C or AB or AC or BC or ABC (e.g., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone: B alone; C alone; A and B in combination; A and C in combination; B and C in combination; or A, B, and C in combination.

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a first user equipment (UE), comprising:
    at least one processor; and
    memory coupled with the at least one processor, the memory storing instructions executable by the at least one processor to cause the apparatus to:
        communicate with a network device via a first link between the first UE and the network device;
        communicate with a second UE via a second link between the first UE and the second UE;
        transmit, to the network device via the first link, an indication of a channel state information (CSI) processing capability for CSI associated with the first link and CSI associated with the second link; and
        receive, from the network device, an indication of one or more rules for performing CSI estimation procedures, the one or more rules being based at least in part on the CSI processing capability.

2. The apparatus of claim 1, wherein the instructions to transmit the indication of the CSI processing capability are executable by the at least one processor to cause the apparatus to:
    transmit a first CSI processing capability associated with the first link and a second CSI processing capability associated with the second link, the first CSI processing capability indicating a first subset of processing units of a total quantity of processing units, and the second CSI processing capability indicating a second subset of processing units of the total quantity of processing units.

3. The apparatus of claim 2, wherein the instructions are further executable by the at least one processor to cause the apparatus to:
    perform, according to the CSI processing capability, CSI estimation procedures associated with the first link and CSI estimation procedures associated with the second link;
    generate a first CSI report for the first link and a second CSI report associated with the second link; and
    transmit the first CSI report and the second CSI report to the network device via the first link.

4. The apparatus of claim 2, wherein the instructions are further executable by the at least one processor to cause the apparatus to:
    trigger a first CSI estimation procedure associated with the first link and a second CSI estimation procedure associated with the first link;
    trigger a third CSI estimation procedure associated with the second link and a fourth CSI estimation procedure associated with the second link;
    place the first CSI estimation procedure and the second CSI estimation procedure in a first queue for the first link; and
    place the third CSI estimation procedure and the fourth CSI estimation procedure in a second queue for the second link.

5. The apparatus of claim 4, wherein the instructions are further executable by the at least one processor to cause the apparatus to:
    perform the first CSI estimation procedure using a first available processing unit of the first subset of processing units based at least in part on triggering the first CSI estimation procedure before triggering the second CSI estimation procedure; and
    perform the third CSI estimation procedure using a first available processing unit of the second subset of processing units based at least in part on triggering the third CSI estimation procedure before triggering the second CSI estimation procedure.

6. The apparatus of claim 1, wherein the instructions to transmit the indication of the CSI processing capability are executable by the at least one processor to cause the apparatus to:
    transmit a CSI processing capability associated with both the first link and the second link, the CSI processing capability indicating a total quantity of processing units for performing CSI estimation procedures on the first link and the second link.

7. The apparatus of claim 6, wherein the instructions are further executable by the at least one processor to cause the apparatus to:
    perform, according to the CSI processing capability, CSI estimation procedures associated with the first link and CSI estimation procedures associated with the second link;
    generate a first CSI report for the first link and a second CSI report associated with the second link; and
    transmit the first CSI report and the second CSI report to the network device via the first link.

8. The apparatus of claim 6, wherein the instructions are further executable by the at least one processor to cause the apparatus to:
    perform, according to the CSI processing capability, CSI estimation procedures associated with the first link and CSI estimation procedures associated with the second link; and
    allocate resources for the second UE on the second link based at least in part on performing the CSI estimation procedures associated with the first link and CSI estimation procedures associated with the second link.

9. The apparatus of claim 6, wherein the instructions are further executable by the at least one processor to cause the apparatus to:
    initiate a first CSI estimation procedure associated with the first link and a second CSI estimation procedure associated with the second link;

select the first CSI estimation procedure or the second CSI estimation procedure based at least in part on which of the first CSI estimation procedure and the second CSI estimation procedure is triggered first in time; and perform the selected CSI estimation procedure using a first available processing unit of the total quantity of processing units.

10. The apparatus of claim 6, wherein the instructions are further executable by the at least one processor to cause the apparatus to:

trigger a first CSI estimation procedure associated with the first link and a second CSI estimation procedure associated with the second link;

compare a first priority level associated with the first CSI estimation procedure with a second priority level associated with the second CSI estimation procedure;

select, based at least in part on the comparing, the first CSI estimation procedure or the second CSI estimation procedure; and perform the selected CSI estimation procedure using a first available processing unit of the total quantity of processing units.

11. The apparatus of claim 10, wherein the instructions are further executable by the at least one processor to cause the apparatus to:

determine, based at least in part on the comparing, that the first priority level and the second priority level are equivalent; and determine, based at least in part on the first priority level and the second priority level being equivalent, which of the first CSI estimation procedure and the second CSI estimation procedure is triggered first in time, wherein using the first available processing unit of the total quantity of processing units to perform the first CSI estimation procedure or the second CSI estimation procedure is based at least in part on determining which of the first CSI estimation procedure and the second CSI estimation procedure is triggered first in time.

12. The apparatus of claim 10, wherein the instructions are further executable by the at least one processor to cause the apparatus to:

trigger a third CSI estimation procedure associated with the first link or the second link, wherein the third CSI estimation procedure is associated with a third priority level;

initiate the third CSI estimation procedure using a second available processing unit of the total quantity of processing units;

trigger a fourth CSI estimation procedure associated with the first link or the second link, wherein the fourth CSI estimation procedure is associated with a fourth priority level that is higher than the third priority level;

release the second available processing unit from the third CSI estimation procedure; and initiate the fourth CSI estimation procedure using the released second available processing unit.

13. An apparatus for wireless communications at a network device, comprising:

at least one processor; and memory coupled with the at least one processor, the memory storing instructions executable by the at least one processor to cause the apparatus to:

communicate with a first UE via a first link between the network device and the first UE;

receive, from the first UE via the first link, an indication of a channel state information (CSI) processing capability of the first UE, for CSI associated with the first link and CSI associated with a second link between the first UE and a second UE;

trigger one or more CSI estimation procedures for the first UE, the second UE, or both, based at least in part on receiving the indication of the CSI processing capability; and transmit, to the first UE, an indication of one or more rules for performing CSI estimation procedures, the one or more rules being based at least in part on the CSI processing capability.

14. The apparatus of claim 13, wherein the instructions to receive the indication of the CSI processing capability are executable by the at least one processor to cause the apparatus to:

receive a first CSI processing capability associated with the first link and a second CSI processing capability associated with the second link, the first CSI processing capability indicating a first subset of processing units of a total quantity of processing units at the first UE, and the second CSI processing capability indicating a second subset of processing units of the total quantity of processing units at the first UE.

15. The apparatus of claim 14, wherein the instructions are further executable by the at least one processor to cause the apparatus to:

receive, from the first UE, a first CSI report associated with the first link and a second CSI report for the second link.

16. The apparatus of claim 14, wherein the instructions are further executable by the at least one processor to cause the apparatus to:

transmit, to the first UE, a first trigger for one or more CSI estimation procedures associated with the first link; and transmit, to the first UE, the second UE, or both, a trigger for one or more CSI estimation procedures associated with the second link.

17. The apparatus of claim 13, wherein the instructions to receive the indication of the CSI processing capability are executable by the at least one processor to cause the apparatus to:

receive a CSI processing capability associated with both the first link and the second link, the CSI processing capability indicating a total quantity of processing units for performing, by the first UE, CSI estimation procedures on the first link and the second link.

18. The apparatus of claim 17, wherein the instructions are further executable by the at least one processor to cause the apparatus to:

receive, from the first UE based at least in part on the CSI processing capability, a first CSI report for the first link and a second CSI report for the second link.

19. A method for wireless communications at a first user equipment (UE), comprising:

communicating with a network device via a first link between the first UE and the network device;

communicating with a second UE via a second link between the first UE and the second UE;

transmitting, to the network device via the first link, an indication of a channel state information (CSI) processing capability for CSI associated with the first link and CSI associated with the second link; and receiving, from the network device, an indication of one or more rules for performing CSI estimation procedures, the one or more rules being based at least in part on the CSI processing capability.

20. The method of claim 19, wherein transmitting the indication of the CSI processing capability comprises:

transmitting a first CSI processing capability associated with the first link and a second CSI processing capability associated with the second link, the first CSI processing capability indicating a first subset of processing units of a total quantity of processing units, and the second CSI processing capability indicating a second subset of processing units of the total quantity of processing units.

21. The method of claim 19, wherein transmitting the indication of the CSI processing capability comprises:
transmitting a CSI processing capability associated with both the first link and the second link, the CSI processing capability indicating a total quantity of processing units for performing CSI estimation procedures on the first link and the second link.

22. A method for wireless communications at a network device, comprising:
communicating with a first UE via a first link between the network device and the first UE;
receiving, from the first UE via the first link, an indication of a channel state information (CSI) processing capability of the first UE, for CSI associated with the first link and CSI associated with a second link between the first UE and a second UE;
triggering one or more CSI estimation procedures for the first UE, the second UE, or both, based at least in part on receiving the indication of the CSI processing capability; and
transmitting, to the first UE, an indication of one or more rules for performing CSI estimation procedures, the one or more rules being based at least in part on the CSI processing capability.

23. The method of claim 22, wherein receiving the indication of the CSI processing capability comprises:
receiving a first CSI processing capability associated with the first link and a second CSI processing capability associated with the second link, the first CSI processing capability indicating a first subset of processing units of a total quantity of processing units at the first UE, and the second CSI processing capability indicating a second subset of processing units of the total quantity of processing units at the first UE.

24. The method of claim 22, wherein receiving the indication of the CSI processing capability comprises:
receiving a CSI processing capability associated with both the first link and the second link, the CSI processing capability indicating a total quantity of processing units for performing, by the first UE, CSI estimation procedures on the first link and the second link.

* * * * *